US011027363B2

(12) United States Patent
Onose et al.

(10) Patent No.: US 11,027,363 B2
(45) Date of Patent: Jun. 8, 2021

(54) IRONING PLATE FOR FRICTION STIR WELDING APPARATUS AND FRICTION STIR WELDING APPARATUS INCLUDING THE SAME, AND FRICTION STIR WELDING METHOD

(71) Applicant: Primetals Technologies Japan, Ltd., Hiroshima (JP)

(72) Inventors: Mitsuru Onose, Hiroshima (JP); Shinichi Kaga, Hiroshima (JP); Satoshi Hirano, Tokyo (JP); Akihiro Satou, Tokyo (JP)

(73) Assignee: PRIMETALS TECHNOLOGIES JAPAN, LTD., Hiroshima (JP)

( * ) Notice: Subject to any disclaimer, the term of this patent is extended or adjusted under 35 U.S.C. 154(b) by 43 days.

(21) Appl. No.: 16/351,558

(22) Filed: Mar. 13, 2019

(65) Prior Publication Data

US 2019/0283174 A1  Sep. 19, 2019

(30) Foreign Application Priority Data

Mar. 19, 2018  (JP) .............................. JP2018-051369

(51) Int. Cl.
*B23K 20/12* (2006.01)
*B23K 11/04* (2006.01)
*B23K 11/087* (2006.01)

(52) U.S. Cl.
CPC .......... *B23K 20/1265* (2013.01); *B23K 11/04* (2013.01); *B23K 20/122* (2013.01);
(Continued)

(58) Field of Classification Search
CPC ...... B23K 20/1265; B23K 20/122–128; B23K 20/1255; B23K 11/04; B23K 20/126; B23K 11/087
(Continued)

(56) References Cited

U.S. PATENT DOCUMENTS 5,697,544 A * 12/1997 Wykes ................. B23K 20/125
                                                                156/580
6,206,268 B1 * 3/2001 Mahoney ........... B23K 20/1255
                                                                228/112.1
(Continued)

FOREIGN PATENT DOCUMENTS

DE  102014115535 B3 *  3/2016  ........... B23K 20/128
EP  2 474 382 A1  7/2012
(Continued)

OTHER PUBLICATIONS

Japanese Office Action received in corresponding Japanese Patent Application No. 2018-051369 dated May 14, 2019.
(Continued)

*Primary Examiner* — Kiley S Stoner
(74) *Attorney, Agent, or Firm* — Mattingly & Malur, PC

(57) ABSTRACT

An ironing plate is attached to a friction stir welding apparatus in such a manner that the ironing plate surrounds an outer peripheral portion of a rotating tool and does not rotate together with the rotating tool, an inside diameter of a portion of the ironing plate into which the rotating tool is inserted is larger than the diameter of the rotating tool, and a material inflow path through which an excessive material of two metallic plates flows in is formed between the ironing plate and the rotating tool when the ironing plate is disposed to surround the outer peripheral portion of the rotating tool.

12 Claims, 18 Drawing Sheets

(52) U.S. Cl.
CPC ........ *B23K 20/126* (2013.01); *B23K 20/1255* (2013.01); *B23K 11/087* (2013.01)

(58) Field of Classification Search
USPC .............................. 228/112.1–114.5, 2.1–2.3
See application file for complete search history.

(56) References Cited

U.S. PATENT DOCUMENTS

| | | | | |
|---|---|---|---|---|
| 7,416,102 | B1* | 8/2008 | Trapp | B23K 20/1225 228/112.1 |
| 7,641,096 | B2* | 1/2010 | Burton | B23K 20/125 228/2.1 |
| 8,998,064 | B2 | 4/2015 | Russell et al. | |
| 2002/0011509 | A1* | 1/2002 | Nelson | B23K 20/129 228/112.1 |
| 2003/0111515 | A1* | 6/2003 | Scheglmann | B23K 20/1235 228/112.1 |
| 2003/0209588 | A1* | 11/2003 | Colligan | B23K 20/1255 228/112.1 |
| 2007/0152015 | A1* | 7/2007 | Burton | B23K 20/126 228/2.1 |
| 2008/0006677 | A1* | 1/2008 | Kumagai | B23K 20/1265 228/101 |
| 2008/0011810 | A1* | 1/2008 | Burford | B23K 20/1255 228/2.1 |
| 2009/0120995 | A1* | 5/2009 | Hallinan | B29C 66/836 228/2.3 |
| 2009/0123778 | A1* | 5/2009 | Russell | B23K 20/1275 428/661 |
| 2009/0255321 | A1* | 10/2009 | Sylva | G01L 25/00 73/1.15 |
| 2009/0308913 | A1* | 12/2009 | Hall | B23K 20/126 228/112.1 |
| 2014/0069985 | A1* | 3/2014 | Okada | B23K 20/1255 228/112.1 |
| 2014/0069986 | A1* | 3/2014 | Okada | B23K 20/123 228/112.1 |
| 2015/0183054 | A1* | 7/2015 | Okada | B23K 20/1255 228/2.1 |
| 2016/0074957 | A1* | 3/2016 | Nishida | B23K 37/0282 228/114.5 |
| 2016/0354860 | A1* | 12/2016 | Boettcher | B23K 20/2336 |
| 2017/0157699 | A1* | 6/2017 | Anzai | B23K 20/1255 |
| 2017/0297142 | A1* | 10/2017 | Saito | B23K 20/1265 |
| 2017/0341176 | A1* | 11/2017 | Okada | B23K 20/126 |
| 2018/0056436 | A1* | 3/2018 | Thomas | B23K 20/128 |
| 2018/0056439 | A1* | 3/2018 | Thomas | B23K 20/124 |
| 2019/0262935 | A1* | 8/2019 | Frohlke | B23K 20/122 |
| 2020/0206840 | A1* | 7/2020 | Hirano | B23K 20/125 |

FOREIGN PATENT DOCUMENTS

| | | | | |
|---|---|---|---|---|
| JP | 2000343244 | A | * 12/2000 | ........ B23K 20/1235 |
| JP | 2003048083 | A | * 2/2003 | |
| JP | 2005-305486 | A | 11/2005 | |
| JP | 2006297434 | A | * 11/2006 | ........ B23K 20/1265 |
| JP | 2007313520 | A | * 12/2007 | |
| JP | 2009-190040 | A | 8/2009 | |
| JP | 4872080 | B2 | * 2/2012 | |
| JP | 5404389 | B | 1/2014 | |
| JP | 2014-208358 | A | 11/2014 | |
| JP | 2017-024018 | A | 2/2017 | |
| JP | 2018-1178 | A | 1/2018 | |
| KR | 101286681 | B1 | * 7/2013 | |
| WO | WO-2019049894 | A1 | * 3/2019 | ............ B23K 20/12 |

OTHER PUBLICATIONS

Extended European Search Report received in corresponding European Patent Application No. 19163579.6 dated Aug. 12, 2019.

* cited by examiner

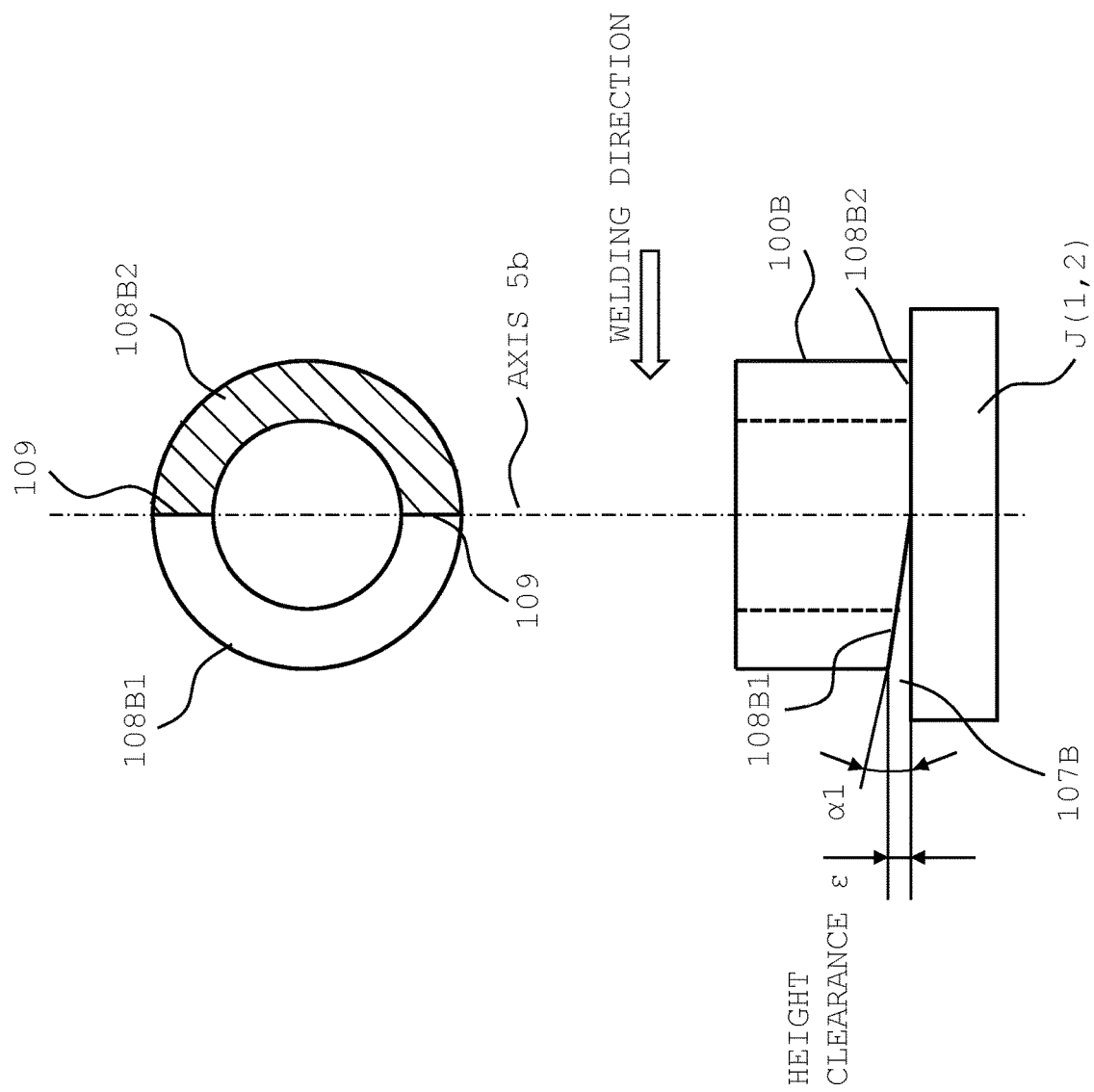

IRONING PLATE FOR FRICTION STIR WELDING APPARATUS AND FRICTION STIR WELDING APPARATUS INCLUDING THE SAME, AND FRICTION STIR WELDING METHOD

CROSS-REFERENCE TO RELATED APPLICATION

The present application claims priority from Japanese application JP 2018-051369, filed on Mar. 19, 2018, the contents of which is hereby incorporated by reference into this application.

BACKGROUND OF THE INVENTION

1. Field of the Invention

The present invention relates to an ironing plate for a friction stir welding apparatus and a friction stir welding apparatus including the same, and a friction stir welding method.

2. Description of the Related Art

As an example of a friction stir welding jig which includes a rotor and by which scattering of a softened work and generation of burrs projecting on a joint surface of the work can be restrained as compared to the related art in the past, a friction stir welding jig including a cylindrically shaped rotor having a joining pin at a tip thereof is described in JP-2005-305486-A (hereinafter, referred to as Patent Document 1). Patent Document 1 describes that the friction stir welding jig includes a flow restraining member that covers an outer peripheral surface of the rotor in an annular form, the flow restraining member is supported in a state of not rotating relative to members to be joined, and a gap between the flow restraining member and the rotor is filled with a lubricant.

In addition, JP-5404389-B (hereinafter, referred to as Patent Document 2) describes a friction stirring method by which a sufficient mixing action and a sufficient solidifying action are maintained and heat input can be controlled. For the purpose of overcoming the problem of surface overheating, the friction stirring method includes inserting a rotary probe of a friction stirring tool into a workpiece, which is a low-conductivity high-melting-point metal or alloy, or a joint part between a set of workpieces, and the probe projects from a shoulder portion, or from between shoulder portions, making contact with the workpiece or workpieces, and is rotated relative to the shoulder portion or portions.

SUMMARY OF THE INVENTION

There is known a friction stir welding technology in which, while rotating a rotating tool, the surface of a shoulder portion provided in a tool main body of the rotating tool is put into contact with surfaces of members to be joined, to perform friction stirring by utilizing frictional heat generated between the surface of the shoulder portion and the surfaces of the members to be joined, whereby the members to be joined are put into a solid phase state equal to or less than the melting point thereof, and the materials are stirred and joined.

This joining technology is put to practical use in various industrial fields for performing joining of mainly aluminum alloys, and of resin materials and the like in addition to metallic materials such as magnesium and iron.

As illustrated in FIG. 1, in the friction stir welding, a probe 5a of a rotating tool 5 is rotated at high speed in a state of being inserted between the members to be joined, and a shoulder portion 5b makes frictional contact with the surfaces of the members to be joined by the high-speed rotation. As depicted in FIG. 1, therefore, surplus material is discharged as burrs 30 from a gap between a part corresponding to an edge end of the shoulder portion 5b and the surfaces of the members to be joined. The burrs 30 are generated on both end sides of a bead 34, in other words, on an advancing side 32 on which the rotating direction of the rotating tool 5 and the friction stirring progressing direction (welding direction or tool feeding direction) coincide with each other, and a retreating side 33 on which the rotating direction of the rotating tool 5 and the friction stirring direction are opposite to each other. Particularly, the burrs 30 are generated in a larger amount on the retreating side 33.

Such burrs are not preferable from the viewpoints of appearance, quality and the like of the product, and should therefore be removed. However, the addition of a removing work to the working process increases the number of steps, needs labor, and leads to a rise in cost of the product. In addition, the amount of the members to be joined at the joint part is reduced correspondingly to the generation of burrs, such problems as groove defects and inside defects (tunnel-shaped defects) may be generated in the joint part, and the joint strength may be lowered.

As part of a technology for preventing such burring and scattering, there is the technology described in Patent Document 1 and the like in which a space between the rotor having the joining pin and the non-rotating flow restraining member is filled with a lubricant. However, by the technology described in Patent Document 1, the discharge of surplus material as burrs from the gap between the flow restraining member and the material surfaces cannot be restrained. Thus, further restraining of burring is demanded.

In addition, also in the technology described in Patent Document 2 in which the rotating probe and the non-rotating shoulder portion as aforementioned are used, the discharge of surplus material as burrs from the gap between the shoulder portion and the material surfaces cannot be restrained, like in the technology described in Patent Document 1. Thus, again, further restraining of burring is requested.

Thus, there is a need for an ironing plate for a friction stir welding apparatus and a friction stir welding apparatus including the same, and a friction stir welding method by which the generation of burrs projecting at joint surface of members to be joined can be restrained more securely as compared to the related art.

According to an aspect of the present invention, there is provided an ironing plate for a friction stir welding apparatus, the ironing plate mounted to the friction stir welding apparatus, the friction stir welding apparatus welding two metallic plates through friction stirring while utilizing frictional heat generated by rotating a rotating tool, in which the ironing plate is mounted to the friction stir welding apparatus in such a manner as to surround an outer peripheral portion of the rotating tool and does not rotate together with the rotating tool, and an inside diameter of a part of the ironing plate in which the rotating tool is inserted is larger than the rotating tool, and, when the ironing plate is disposed in such a manner as to surround the outer peripheral portion of the rotating tool, a material inflow passage into which a surplus material generated due to the welding of the two metallic plates flows is formed between the ironing plate and the rotating tool.

According to the described aspect of the present invention, the generation of burrs projecting at the joint surface of members to be joined can be restrained more assuredly as compared to the related art. The other problems, configurations and effects than the aforementioned will be made clear by the following description of embodiments of the present invention.

BRIEF DESCRIPTION OF THE DRAWINGS

FIG. 9B is a figure illustrating a contact part between the ironing plate of Embodiment 2 and a surface of a metallic plate;

DESCRIPTION OF THE PREFERRED EMBODIMENTS

Figure 1:
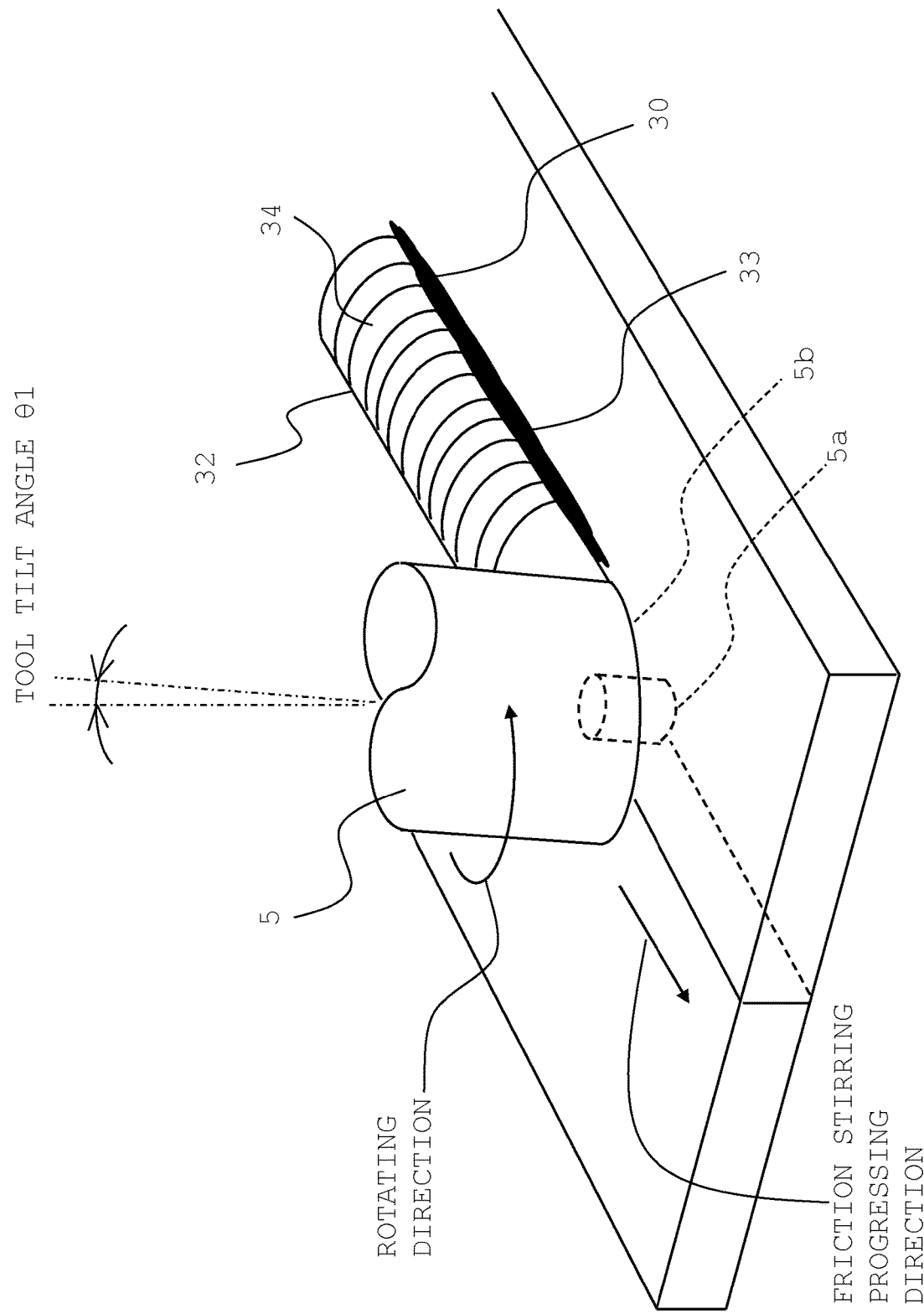
FIG. 1 is a top plan view illustrating an outline of generation of burrs in general friction stir welding.

Embodiments of an ironing plate for a friction stir welding apparatus and a friction stir welding apparatus including the same, and a friction stir welding method according to the present invention will be described below, referring to the drawings. In the following Embodiments, descriptions will be made taking a metallic plate (for example, plate of ferrous metal such as steel plate, or plate of nonferrous metal such as aluminum alloy or copper alloy) to be subjected to cold rolling as an example of the member to be welded.

Embodiment 1

Embodiment 1 of the ironing plate for the friction stir welding apparatus and the friction stir welding apparatus including the same, and the friction stir welding method according to the present invention will be described referring to FIGS. 2 to 5.

Figure 2:
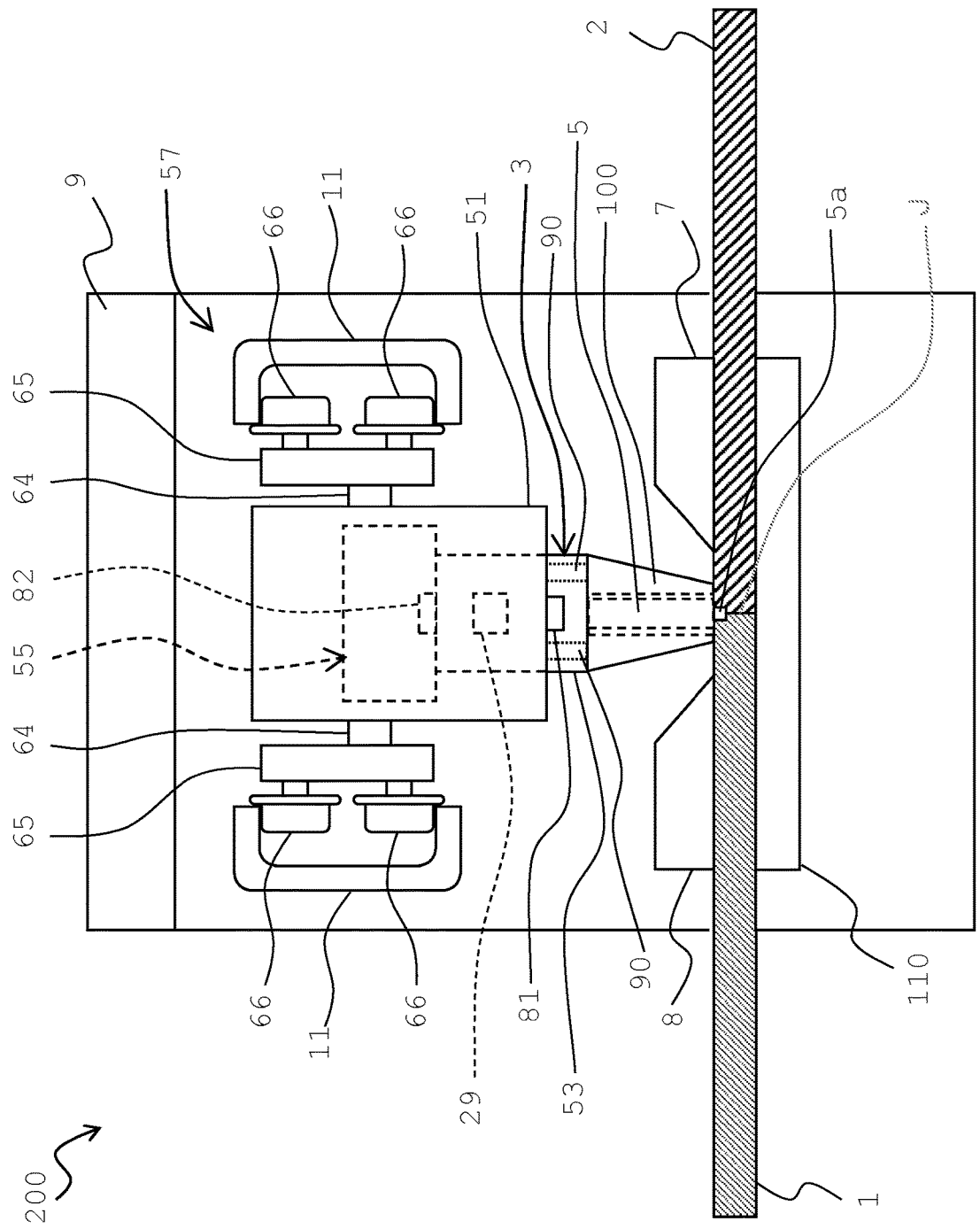
FIG. 2 is a schematic front view of a friction stir welding apparatus according to Embodiment 1 of the present invention.

First, a general outline of a friction stir welding apparatus according to Embodiment 1 will be described referring to FIGS. 2 and 3. FIG. 2 is a schematic front view of the friction stir welding apparatus of Embodiment 1, and FIG. 3 is a side view of the friction stir welding apparatus illustrated in FIG. 2.

Figure 3:
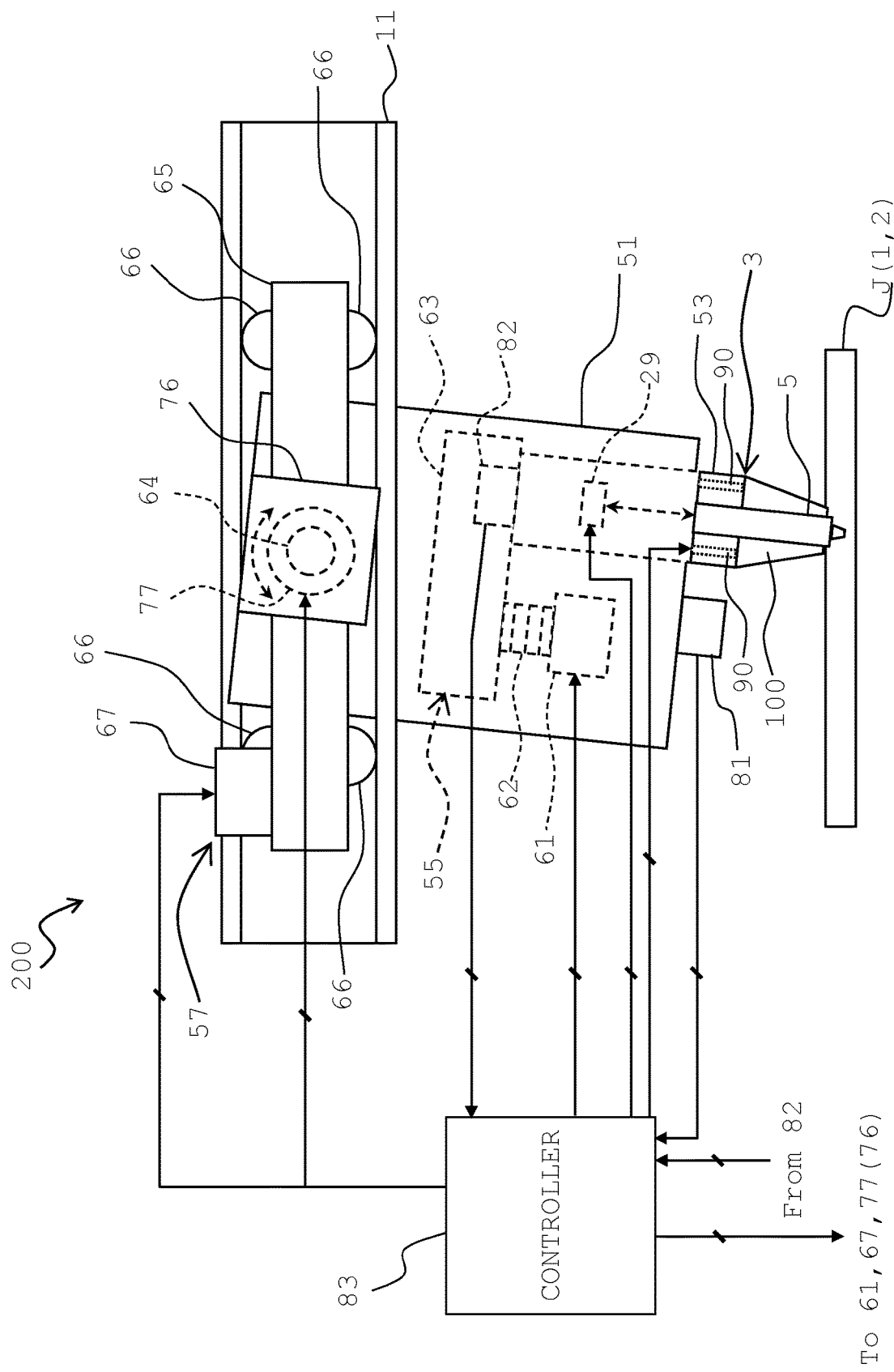
FIG. 3 is a side view of the friction stir welding apparatus illustrated in FIG. 2.

In FIGS. 2 and 3, a friction stir welding apparatus 200 for metallic plates according to the present embodiment includes a gripping device 7, a gripping device 8, a friction stirring device 3, a rotating tool pressing force adjusting device 55, and a moving device 57. A welding direction of two metallic plates 1 and 2 by the friction stir welding apparatus 200 illustrated in FIG. 2 is a direction perpendicular to the paper surface of FIG. 2.

The gripping device 7 is a device for gripping the face and back sides of the metallic plate 2 together with a back plate 110. The gripping device 7 is provided integrally with a housing 9, and can be opened and closed by an opening/closing mechanism (omitted from illustration) including a driving device (omitted from illustration). The gripping device 7 is formed, at an end face on the friction stirring device 3 side, with an inclined surface.

The gripping device 8 is a device for gripping the face and back sides of the metallic plate 1 together with the back plate 110. The gripping device 8 is provided integrally with the housing 9, and can be opened and closed by an opening/closing mechanism (omitted from illustration) including a driving device (omitted from illustration). The gripping device 8 is formed, at an end face on the friction stirring device 3 side, with an inclined surface.

In the friction stirring device 3, a rotating tool 5 and an ironing plate 100 are mounted on the face side of a joint part J of the metallic plates 1 and 2. In addition, the friction stirring device 3 has a cylinder body 53 that holds the rotating tool 5. The cylinder body 53 is at least partly accommodated in a main body case 51. A rotating motor 29 for rotationally driving the rotating tool 5 is incorporated in the cylinder body 53.

Note that, in the case of but welding the metallic plates 1 and 2, the butting part is the joint part J, whereas in the case of lap welding the metallic plates 1 and 2, the lapping part is the joint part J.

The rotating tool pressing force adjusting device 55 is a device that moves the rotating tool 5 of the friction stirring device 3 in a direction toward the joint part J of the metallic plates 1 and 2, to press a shoulder portion 5b (see FIG. 4 etc.) of the rotating tool 5 against the two metallic plates 1 and 2.

As illustrated in FIG. 3, the rotating tool pressing force adjusting device 55 includes a pressing motor 61 provided in the main body case 51, a screw 62 rotationally driven by the pressing motor 61, and a support frame 63 moved rectilinearly in an axial direction of the screw 62 by the rotation of the screw 62. The cylinder body 53 of the friction stirring device 3 is attached to the support frame 63 in such a manner as to be moved rectilinearly in the axial direction of the screw 62 together with the support frame 63.

The moving device 57 is a device for moving the rotating tool 5 of the friction stirring device 3 along the joint part J in a direction orthogonal to the progressing direction of the metallic plates 1 and 2. The moving device 57 includes: left and right rails 11 fixed to the housing 9; left and right running frames 65 that support the main body case 51 through a shaft 64; wheels 66 that are provided on the left and right sides and on the front and rear sides on the left and right running frames 65 and run on the rails 11; and a running motor 67 that is attached to the left and right running frames 65 and drives either the front wheels or the rear wheels.

As illustrated in FIG. 3, the friction stir welding apparatus according to the present embodiment may further include an inclination support device 76 that supports the axis of the rotating tool 5 of the friction stirring device 3 in a state in which the rotating tool 5 and the ironing plate 100 are inclined in such a manner that the tip side of the rotating tool 5 is located on the forward side in regard of the progressing direction of welding of the two metallic plates 1 and 2. The inclination support device 76 is of an angle adjustment system in which the inclination of the axis of the rotating tool 5 can be adjusted from a position of being orthogonal to the metallic plates to a desired angle. The inclination support device 76 has an angle adjusting motor 77 that is provided on one of the left and right running frames 65 and rotationally drives the shaft 64 supported by the running frames 65. Note that the inclination support device 76 may be of a fixation system in which the axis of the rotating tool 5 is fixedly supported in an inclined state.

Besides, as illustrated in FIGS. 2 and 3, the friction stir welding apparatus 200 includes a position meter 81 attached to a lower surface of the main body case 51, a load meter 82 mounted between the cylinder body 53 of the friction stirring device 3 and the support frame 63, and a controller 83.

The controller 83 receives measurement results inputted from the position meter 81 and the load meter 82, performs predetermined arithmetic processing, and sends instruction signals to the rotating motor 29 of the friction stirring device 3, the pressing motor 61 of the rotating tool pressing force adjusting device 55, and the running motor 67 of the moving device 57, to thereby control the operations of the friction stirring device 3, the rotating tool pressing force adjusting device 55, and the moving device 57.

In the case where the inclination support device 76 is of the angle adjustment system, the controller 83 sends an instruction signal to the angle adjusting motor 77 of the inclination support device 76, based on preliminarily set data, to support the rotating tool 5 in a state of being inclined at a predetermined angle.

Note that, while the position meter 81 is of a non-contact type in the example illustrated, it may be of a contact system.

The ironing plate 100 is structured to be movable in a pressing direction (the axial direction of the rotating tool 5) by pressing force adjusting means 90. For the movable control of the ironing plate 100, the controller 83 is used. A control method includes receiving the measurement results inputted from a position meter not illustrated and a load meter not illustrated, performing predetermined arithmetic processing, and controlling the operation of the pressing force adjusting means 90. A hydraulic, pneumatic, electrically driven or other actuator is appropriately applied as the pressing force adjusting means.

Figure 4:
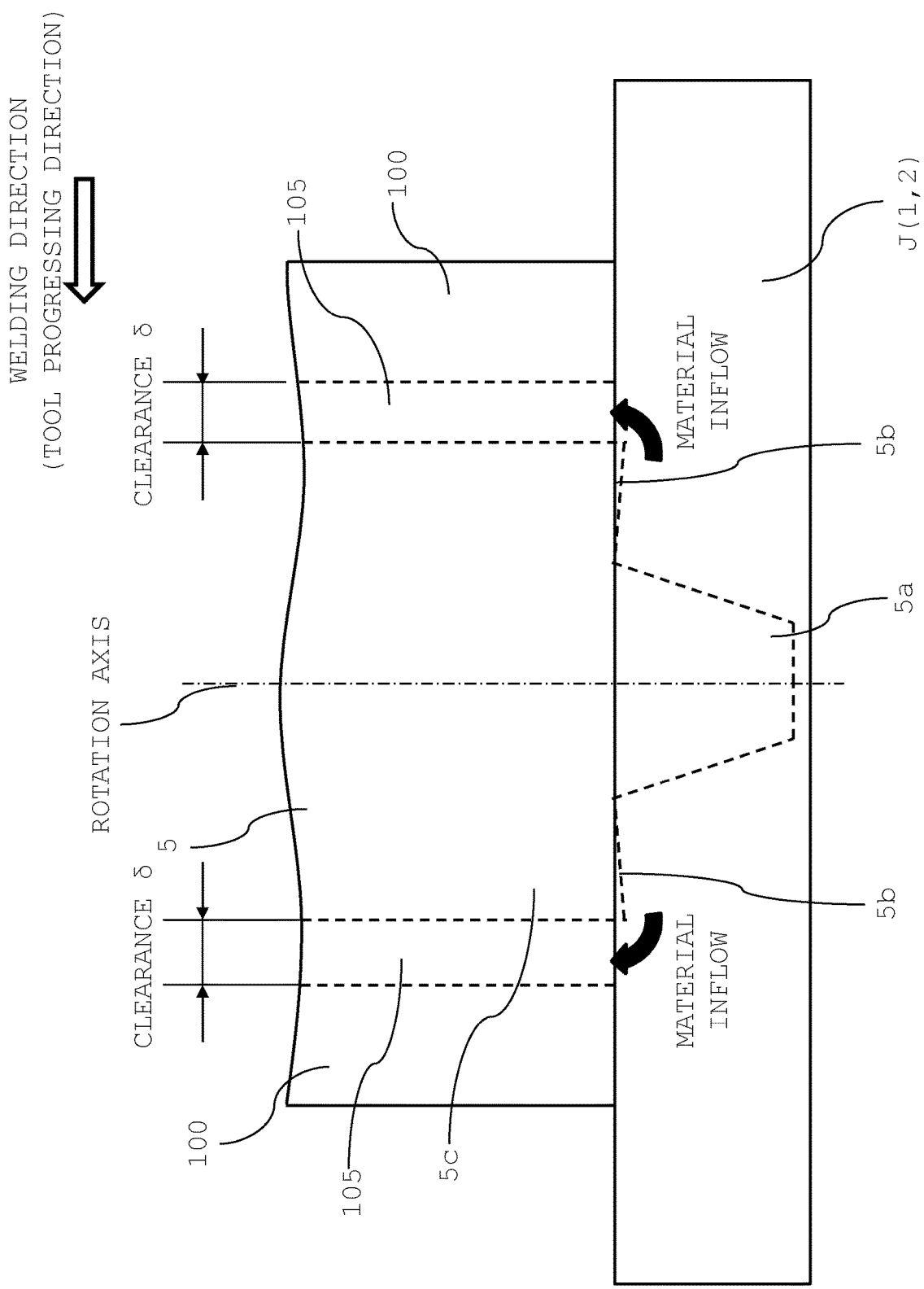
FIG. 4 is a figure illustrating schematically an ironing plate provided in the friction stir welding apparatus of Embodiment 1 and the surroundings thereof.

An outline of the rotating tool 5 and the ironing plate 100 provided in the friction stir welding apparatus 200 of the present embodiment will be described below, referring to FIGS. 4 and 5. FIG. 4 is a figure illustrating schematically the ironing plate and the surroundings thereof, and FIG. 5 is a top plan view of the ironing plate.

As depicted in FIG. 4, the rotating tool 5 includes a cylindrical tool main body 5c, and a probe 5a attached to a tip portion of the tool main body 5c. The probe 5a is smaller than the tool main body 5c in diameter. The shoulder portion 5b is formed in the periphery of that part of the tip portion of the tool main body 5c at which the probe 5a is attached.

Figure 5:
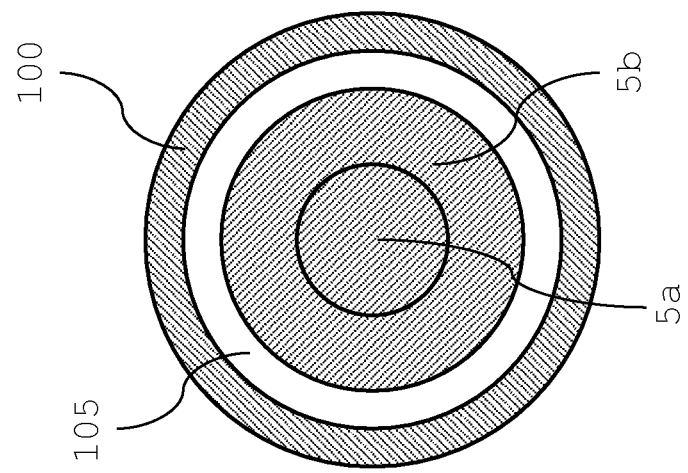
FIG. 5 is a top plan view illustrating schematically the ironing plate provided in the friction stir welding apparatus of Embodiment 1.

As illustrated in FIG. 5, the shoulder portion 5b includes a conical surface which is located at the whole part of the end face of the tool main body 5c and is slightly hollowed in a central area. In this case, the diameter of the shoulder portion 5b is the same as the diameter of the tool main body 5c.

In order to enhance welding speed at the time of line welding, the quantity of heat inputted to the metallic plates 1 and 2 should be increased. In the quantity of heat inputted to the metallic plates 1 and 2 by the rotating tool 5, frictional heat obtained by contact of the rotating shoulder portion 5b with the metallic plates 1 and 2 is predominant, and, therefore, the shoulder portion 5b should be provided.

The ironing plate 100 depicted in FIG. 4 is mounted to the friction stirring device 3 of the friction stir welding apparatus 200 in such a manner as to surround an outer peripheral portion of the rotating tool 5 and does not rotate together with the rotating tool 5. As illustrated in FIG. 5, the ironing plate 100 is a cylindrically shaped plate surrounding the periphery of the rotating tool 5.

As illustrated in FIGS. 4 and 5, an inside diameter of a part of the ironing plate 100 in which the rotating tool 5 is inserted is larger than the tool main body 5c of the rotating tool 5, so that, when the ironing plate 100 is disposed such as to surround an outer peripheral portion of the rotating tool 5, a material inflow passage 105 into which surplus material of the two metallic plates 1 and 2 flows is formed between the ironing plate 100 and the rotating tool 5.

The positional relationship between the rotating tool 5 and the ironing plate 100 in the rotation axis direction need not be specially adjusted at the time of mounting the ironing plate 100, since the positional relationship is appropriately controlled by the pressing force adjusting means 90, in the case where the pressing force adjusting means 90 is provided as in the present embodiment. On the other hand, in the case where the pressing force adjusting means 90 is not provided, the ironing plate 100 is disposed relative to the rotating tool 5 in such a manner that the end face of the ironing plate 100 on the side of the metallic plates 1 and 2 makes contact with the metallic plates 1 and 2 when the rotating tool 5 is inserted into the joint part J sufficiently for friction stirring of the metallic plates 1 and 2. This ensures that the ironing plate 100 is sliding moved on the metallic plates 1 and 2 at the time of welding, whereby the surplus material generated can be dammed up inside the ironing plate 100, and the surfaces of the metallic plates 1 and 2 after welding can be smoothened.

The clearance δ of the material inflow passage 105 in a direction orthogonal to the rotation axis is half the difference between the inside diameter of the ironing plate 100 and an outside diameter of the tool main body 5c, is the same on the forward side and the backward side in regard of the progressing direction of welding, and depends on the thickness of the metallic plates 1 and 2 to be welded. The relation between the thickness of the metallic plates 1 and 2 and the gap is desirably conditioned to satisfy the ranges set forth in Table 1 below, and is particularly desirable to satisfy the relational expression of δ≤Tmax, where δ is the clearance of the material inflow passage, and Tmax is the maximum plate thickness.

TABLE 1

| Thickness of metallic plates to be welded | Material inflow passage δ |
|---|---|
| less than 1 mm | equal to or less than 1 mm |
| equal to or more than 1 and less than 2 mm | equal to or less than 2 mm |
| equal to or more than 2 and less than 4 mm | equal to or less than 4 mm |
| equal to or more than 4 and less than 6 mm | equal to or less than 6 mm |
| equal to or more than 6 and less than 8 mm | equal to or less than 8 mm |
| equal to or more than 8 and less than 10 mm | equal to or less than 10 mm |
| equal to or more than 10 mm | equal to or less than 12 mm |

Note that the clearance δ of the material inflow passage 105 may not necessarily be the same, but may be different, on the forward side and the backward side in regard of the progressing direction of welding. The surplus material is generated more on the forward side of the rotating tool 5. In the case where the sum of the clearance of the material inflow passage 105 on the forward side and that on the backward side is 2δ, therefore, setting the forward-side clearance to be larger than the backward-side clearance ensures that the surplus material can be made to flow into the material inflow passage 105 more efficiently than in the case where the forward-side clearance and the backward-side clearance are equal (=δ).

In addition, the surplus material is generated more on the retreating side of the rotating tool 5. Therefore, in the case where the sum of the clearance of the material inflow passage 105 on the retreating side and that on the advancing side is 2δ, setting the retreating-side clearance to be larger than the advancing-side clearance ensures that the surplus material can be made to flow into the material inflow passage 105 more efficiently than in the case where the retreating-side clearance and the advancing-side clearance are equal (=δ).

The rotating tool 5 and the ironing plate 100 are mounted such as to be independently detachable from the friction stirring device 3, and, when consumed, can be replaced with a new rotating tool 5 and a new ironing plate 100, respectively.

A friction stir welding method according to the present embodiment that is preferably conducted using the aforementioned friction stir welding apparatus will be described below.

In the welding method according to the present embodiment, first, the face and back sides of the metallic plate 2 are gripped by the gripping device 7 and the back plate 110, while the face and back sides of the metallic plate 1 are gripped by the gripping device 8 and the back plate 110, and the rotating tool 5 is disposed on the upper side of the joint part J where the two metallic plates 1 and 2 are butted against each other.

Next, the rotating tool pressing force adjusting device 55 is driven to move the rotating tool 5 toward the joint part J where the two metallic plates 1 and 2 are butted. In addition, the friction stirring device 3 is driven to rotate the rotating tool 5, and the shoulder portion 5b of the rotating tool 5 is pressed against the upper surface side of the joint part J, to subject the metallic plates 1 and 2 to friction stirring.

Thereafter, the moving device 57 is driven to perform friction stir welding of the metallic plates 1 and 2 while rotating the rotating tool 5 along the joint part J.

In this instance, the surplus material generated from a gap between a part corresponding to an edge end of the shoulder portion 5b and the surfaces of the metallic plates 1 and 2 flows into the material inflow passage 105 formed between the rotating tool 5 and the ironing plate 100. As illustrated in FIG. 1, therefore, the discharge of the surplus material as burrs 30 on the advancing side 32 and the retreating side 33 of a bead 34 is restrained as compared to the case of the related art.

Note that the surplus material having flowed into the material inflow passage 105 may be removed by detaching the ironing plate 100 from the friction stirring device 3 after the welding is finished. Alternatively, a space of a volume sufficiently larger than the whole amount of the surplus material may be preliminarily connected to the material inflow passage 105, the surplus material may be accumulated in the space, and the surplus material may be removed as required.

Now, advantageous effects of the present embodiment will be described below.

The ironing plate 100 is mounted to the friction stir welding apparatus 200 in such a manner as to surround the outer peripheral portion of the rotating tool 5 and does not rotate together with the rotating tool 5, and the pressing force adjusting means 90 is provided such that the ironing plate 100 is movable in the axial direction (pressing direction). The inside diameter of the part of the ironing plate 100 in which the rotating tool 5 is inserted is larger than the rotating tool 5, and, when the ironing plate 100 is disposed so as to surround an outer peripheral portion of the rotating tool 5, the material inflow passage 105 into which the surplus material of the two metallic plates 1 and 2 flows is formed between the ironing plate 100 and the rotating tool 5.

In the embodiment of Patent Document 1 mentioned above, the gap between the rotating element and the non-rotating flow restraining member is equal to or less than 0.5 mm, and the gap is filled with a lubricant. In such a case, the surplus material pushed out by the rotating element cannot flow into the gap filled with the lubricant, and is therefore discharged to the exterior of the flow restraining member, resulting in a problem that a bur-restraining effect is low. It is considered that in Patent Document 1, the narrow gap of equal to or less than 0.5 mm is set because the lubricant cannot be held if the gap is wide.

In addition, in the technology described in Patent Document 1, if the pressing force is insufficient at the time of high-speed welding (equal to or more than 1 m/min), weld defects (groove defects in the surface or tunnel defects inside the joint part) would be generated. Further, while the pressing force should be increased for restraining the generation of weld defects, the amount of insertion of the probe and the shoulder surface into the material should be increased for increasing the pressing force. However, this results in a problem that the material in an amount corresponding to the volume of insertion becomes surplus material and is discharged as burrs at an end surface of the weld bead.

Besides, in the technology described in Patent Document 2, there is margin for further restraining of burring, and the quantity of heat inputted to the material becomes insufficient at the time of high-speed welding (welding speed of equal to or more than 1 m/min), so that the material cannot be softened, and unsatisfactory stirring of the material is generated, leading to weld defects. In addition, the load in the progressing direction is raised, leading to enlarged equipment, thereby worsening economy.

On the other hand, where the material inflow passage 105 formed such as to permit positive flow of the surplus material there into is provided as in the present embodiment, it is thereby possible to restrain the discharge of the surplus material to the outer periphery side of the ironing plate 100 more assuredly than in the related art, and, therefore, burring can be restrained more securely than in the related art. In addition, since the ironing plate 100 is mounted to the friction stir welding apparatus 200 in such a manner as does not rotate together with the rotating tool 5, enlargement of equipment can be restrained.

Besides, with the rotating tool having the probe 5a and the shoulder portion 5b in an integrated form, frictional heat generation can be performed at the shoulder portion 5b, and a sufficient quantity of heat can be generated at the time of high-speed welding. Therefore, defective welding can be restrained, and the risk of breakage of the probe can be lowered, as compared to the case where only the probe is rotated at high speed, as in the technology described in Patent Document 2, for example.

Further, with the probe 5a inserted into the material and subjected to stirring, the material portion in the state of being most liable to be softened and to flow is prevented from immediately flowing into the material inflow passage 105 by the shoulder portion 5b; therefore, the material inflow passage 105 is prevented from coming, in a short time, to be unable to function.

In addition, with the space as the material inflow passage 105 intentionally provided between the rotating tool 5 and the stationary ironing plate 100, the rotating tool 5 and the ironing plate 100 are prevented from wearing or deforming through making contact with each other.

Besides, with the structure in which the ironing plate 100 is controlled in a movable manner in the axial direction (pressing direction) by the pressing force adjusting means 90, the pressing force necessary for welding and the pressing force required for restraining the discharge of surplus material can be controlled individually. Consequently, defective welding can be restrained from being generated due to an insufficient pressing force or excessive insertion of the rotating tool 5.

<Modification 1 of Embodiment 1>

Figure 6:
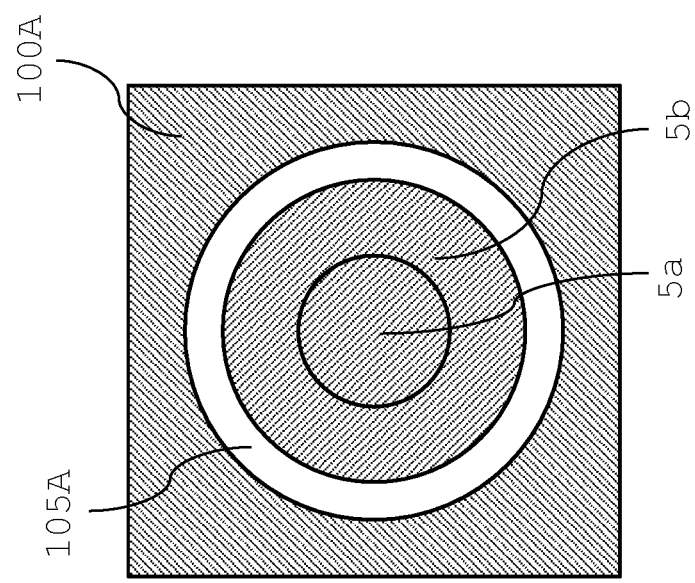
FIG. 6 is a top plan view illustrating schematically an ironing plate provided in a friction stir welding apparatus according to Modification 1 of Embodiment 1 of the present invention.

Modification example 1 of the ironing plate for the friction stir welding apparatus and the friction stir welding apparatus including the same, and the friction stir welding method of Embodiment 1 will be described below, referring to FIG. 6. The same components as those in Embodiment 1 are denoted by the same reference symbols as used above, and descriptions of them will be omitted. The same applies also to the other modifications and other embodiments. FIG. 6 is a top plan view illustrating schematically an ironing plate provided in a friction stir welding apparatus according to Modification 1 of Embodiment 1.

Modification 1 illustrated in FIG. 6 has the same structures and operations as those in Embodiment 1, except that an ironing plate 100A has a rectangular parallelepiped shape surrounding the periphery of the rotating tool 5.

The ironing plate 100A in Modification 1 as illustrated in FIG. 6 is also mounted to the friction stirring device 3 of the friction stir welding apparatus 200 in such a manner as to surround an outer peripheral portion of the rotating tool 5 and does not rotate together with the rotating tool 5. As depicted in FIG. 6, an inside diameter of a part of the ironing plate 100A in which the rotating tool 5 is inserted is larger than the tool main body 5c of the rotating tool 5, and, when the ironing plate 100A is disposed such as to surround an outer peripheral portion of the rotating tool 5, a material inflow passage 105A into which a surplus material of the two metallic plates 1 and 2 flows is formed between the ironing plate 100A and the rotating tool 5.

By such an ironing plate 100A of Modification 1, similar effects to those of Embodiment 1 are obtained.

<Modification 2 of Embodiment 1>

Figure 7:
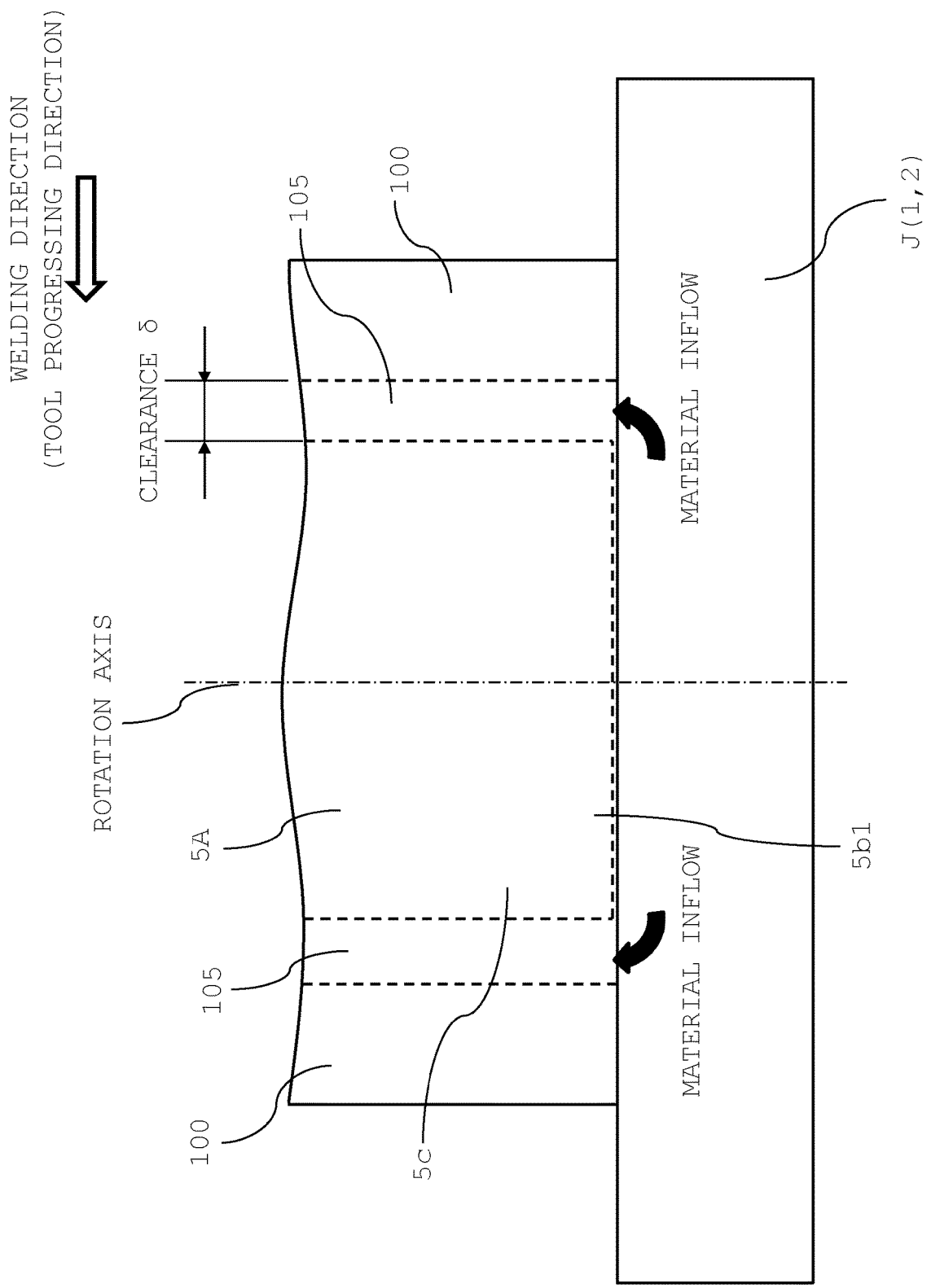
FIG. 7 is a figure illustrating schematically an ironing plate provided in a friction stir welding apparatus according to Modification 2 of Embodiment 1 of the present invention and the surroundings thereof.

Modification 2 of the ironing plate for the friction stir welding apparatus and the friction stir welding apparatus including the same, and the friction stir welding method of Embodiment 1 will be described below, referring to FIG. 7. FIG. 7 is a figure illustrating schematically an ironing plate provided in a friction stir welding apparatus according to Modification 2 of Embodiment 1 and the surroundings thereof.

While the ironing plate 100 of Modification 2 depicted in FIG. 7 is similar to that of Embodiment 1 illustrated in FIG. 4, the probe is not formed at the tip of the rotating tool 5A, but there is a shoulder portion 5b1 which includes a flat surface at the tip. Other than the rotating tool 5A, the structures and operations are the same as those in Embodiment 1. The rotating tool 5A is rotated in the state of making contact with the surfaces of the metallic plates 1 and 2, without being inserted into the metallic plates 1 and 2 like the probe.

The rotating tool 5A of the present modification is preferable for use when the stirring range of the metallic plates 1 and 2 may be surface layer portions, for example, in the case of extremely thin plates of a thickness of equal to or less than 0.5 mm, or in the case of tack welding prior to production welding.

<Modification 3 of Embodiment 1>

Figure 8:
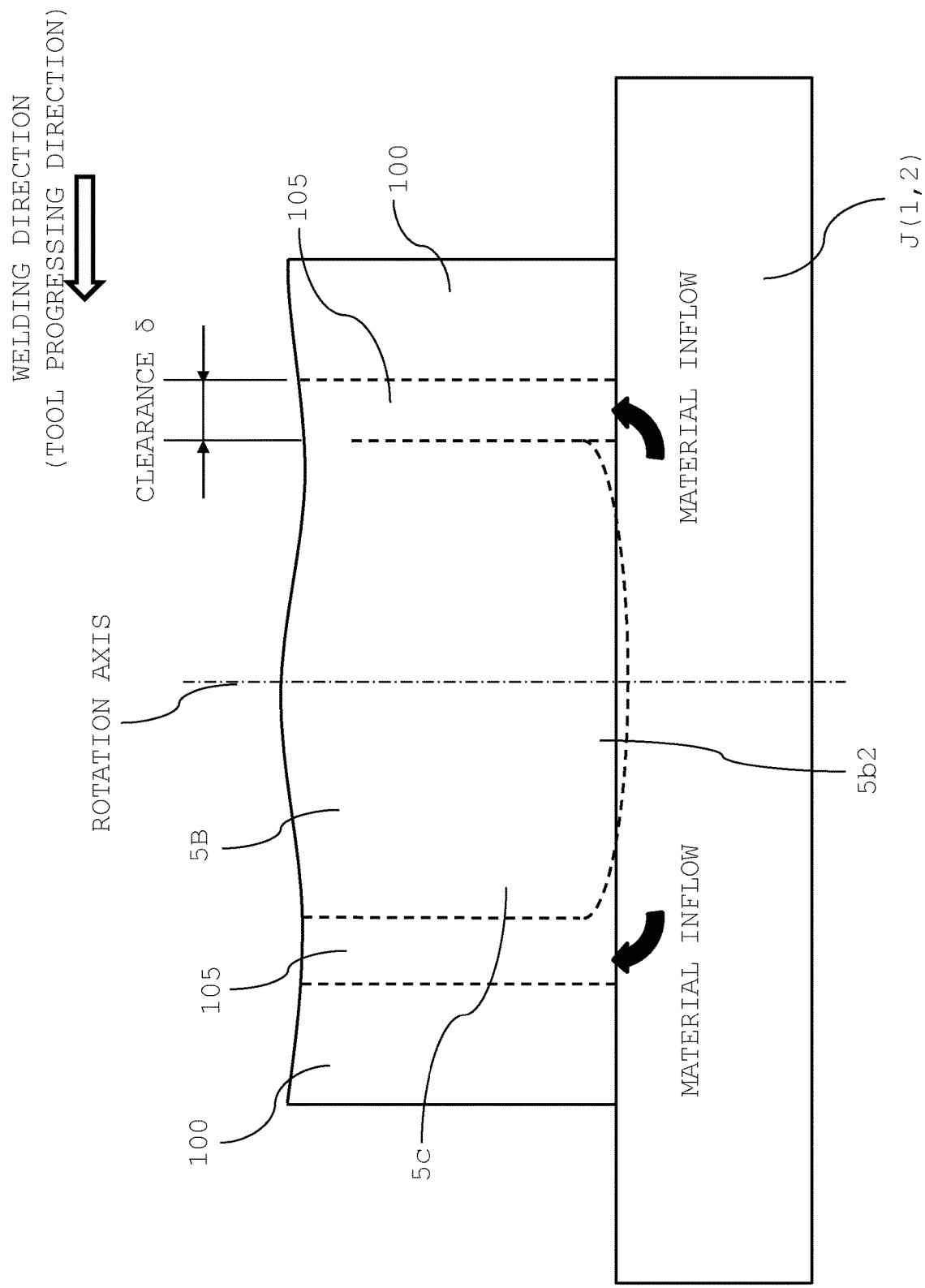
FIG. 8 is a figure illustrating schematically an ironing plate provided in a friction stir welding apparatus according to Modification 3 of Embodiment 1 of the present invention and the surroundings thereof.

Modification 3 of the ironing plate for the friction stir welding apparatus and the friction stir welding apparatus including the same, and the friction stir welding method of Embodiment 1 will be described below, referring to FIG. 8. FIG. 8 is a figure illustrating schematically an ironing plate provided in a friction stir welding apparatus according to Modification of Embodiment 1 and the surroundings thereof.

While the ironing plate 100 of Modification 3 illustrated in FIG. 8 is similar to that of Embodiment 1 depicted in FIG.

4, the probe is not formed at the tip of a rotating tool 5B, but there is a shoulder portion 5b2 having a roughly hemispherical shape at the tip. Other than the rotating tool 5B, the structures and operations are the same as those in Embodiment 1. The rotating tool 5B is rotated in a state in which a roughly hemispherical part projecting most to the outside in the axial direction thereof is inserted in the metallic plates 1 and 2.

Like in Modification 2 of Embodiment 1, the rotating tool 5B of the present modification is also preferably for use when the stirring range of the metallic plates 1 and 2 may be surface layer portions, for example, extremely thin plates of a thickness of equal to or less than 0.5 mm, or in the case of tack welding prior to production welding. In addition, the space between the shoulder portion 5b2 and the metallic plates 1 and 2 becomes larger in going toward the outer periphery of the rotating tool 5B, which permits the surplus material to easily flow into the material inflow passage 105.

Embodiment 2

Figure 9A:
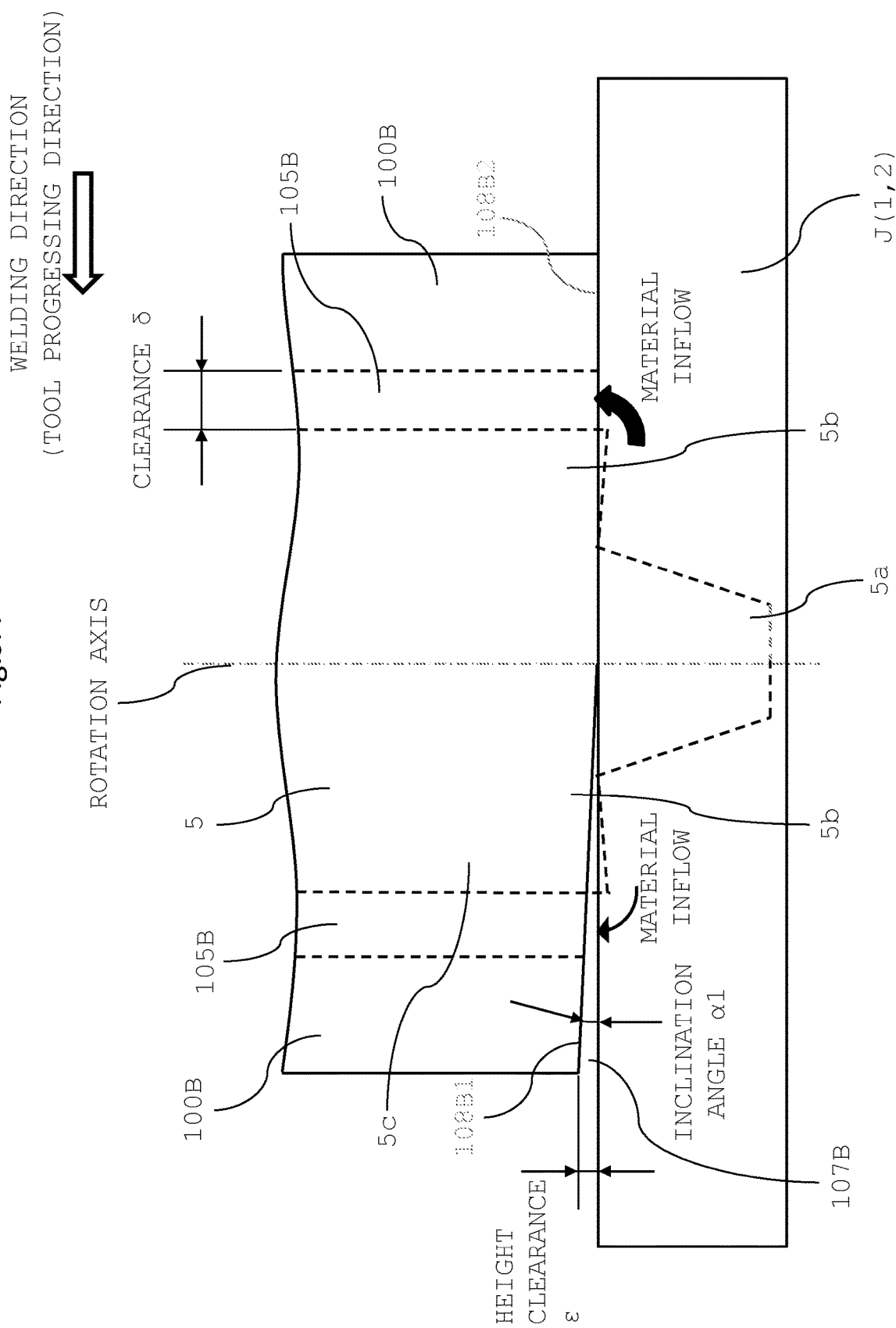
FIG. 9A is a figure illustrating schematically an ironing plate provided in a friction stir welding apparatus according to Embodiment 2 of the present invention and the surroundings thereof.

The ironing plate for the friction stir welding apparatus and the friction stir welding apparatus including the same, and the friction stir welding method according to Embodiment 2 of the present invention will be described below, referring to FIGS. 9A and 9B. FIG. 9A is a figure illustrating schematically an ironing plate provided in a friction stir welding apparatus of Embodiment 2 and the surroundings thereof, and FIG. 9B is a figure illustrating the contact part between the ironing plate and the surface of the metallic plate in Embodiment 2.

The ironing plate 100B of the present embodiment depicted in FIG. 9A differs from the ironing plate 100 of Embodiment 1 in that a part of its surface facing the two metallic plates 1 and 2 has an inclined surface (first inclined surface) 108B1 inclined relative to a plane 108B2 orthogonal to the rotation axis of the rotating tool 5. In other points, the structures and operations are the same as those in Embodiment 1.

As illustrated in FIG. 9A, an inside diameter of a part of the ironing plate 100B of the present embodiment in which the rotating tool 5 is inserted is larger than the tool main body 5c of the rotating tool 5, and, when the ironing plate 100B is disposed such as to surround an outer peripheral portion of the rotating tool 5, a material inflow passage 105B having a clearance δ into which surplus material flows is formed between the ironing plate 100B and the rotating tool 5.

In addition, as depicted in FIG. 9B, the ironing plate 100B of the present embodiment is formed, on the forward side in regard of the progressing direction of welding of the two metallic plates 1 and 2 by the friction stir welding apparatus 200, with the inclined surface 108B1 inclined relative to the plane 108B2 orthogonal to the tool rotation axis. The angle formed between the plane 108B2 (in the present embodiment, a horizontal plane) orthogonal to the tool rotation axis and the inclined surface 108B1 is made to be an inclination angle. The plane 108B2 orthogonal to the tool rotation axis and the inclined surface 108B1 intersect each other to form an intersection line 109. The intersection line 109 is located at the center of the ironing plate 100B in the tool progressing direction, and the inclined surface 108B1 is formed on the forward side in regard of the progressing direction of the ironing plate 100B. The inclination angle of the inclined surface 108B1 relative to the horizontal plane is α1. With the inclined surface 108B1 thus formed, a gap 107B (opening portion) is formed when the ironing plate 100b is disposed such as to surround an outer peripheral portion of the rotating tool 5. The gap 107B has a height clearance of ε on the forwardmost end side in regard of the progressing direction.

On the backward side in regard of the progressing direction of the ironing plate 100B, there is a surface orthogonal to the tool rotation axis and parallel to the horizontal direction.

Such an ironing plate 100B is preferably produced by cutting twice a lower surface in regard of the rotation axis direction of a cylindrical or rectangular parallelepiped plate, but this is not limitative.

The method of performing friction stir welding by use of such an ironing plate 100B is the same as in Embodiment 1, and detailed description thereof is omitted.

According to the ironing plate 100B and the friction stir welding method using the same of Embodiment 2 of the present invention, also, substantially the same effects as those of the ironing plate 100 and the friction stir welding method using the same of Embodiment 1 described above are obtained.

In addition, since the ironing plate 100B is provided with the opening on the forward side in regard of the welding direction, the material surface on the forward side of the rotating tool 5 would not be shaved by the ironing plate 100B, and generation of weld defects can be reduced more assuredly than in Embodiment 1. Besides, since the ironing plate 100B is in contact with the surfaces of the metallic plates 1 and 2 on the backward side, discharge of burrs to the exterior of the ironing plate 100B can be restrained as compared to the case of the related art.

Modification of Embodiment 2

Figure 10:
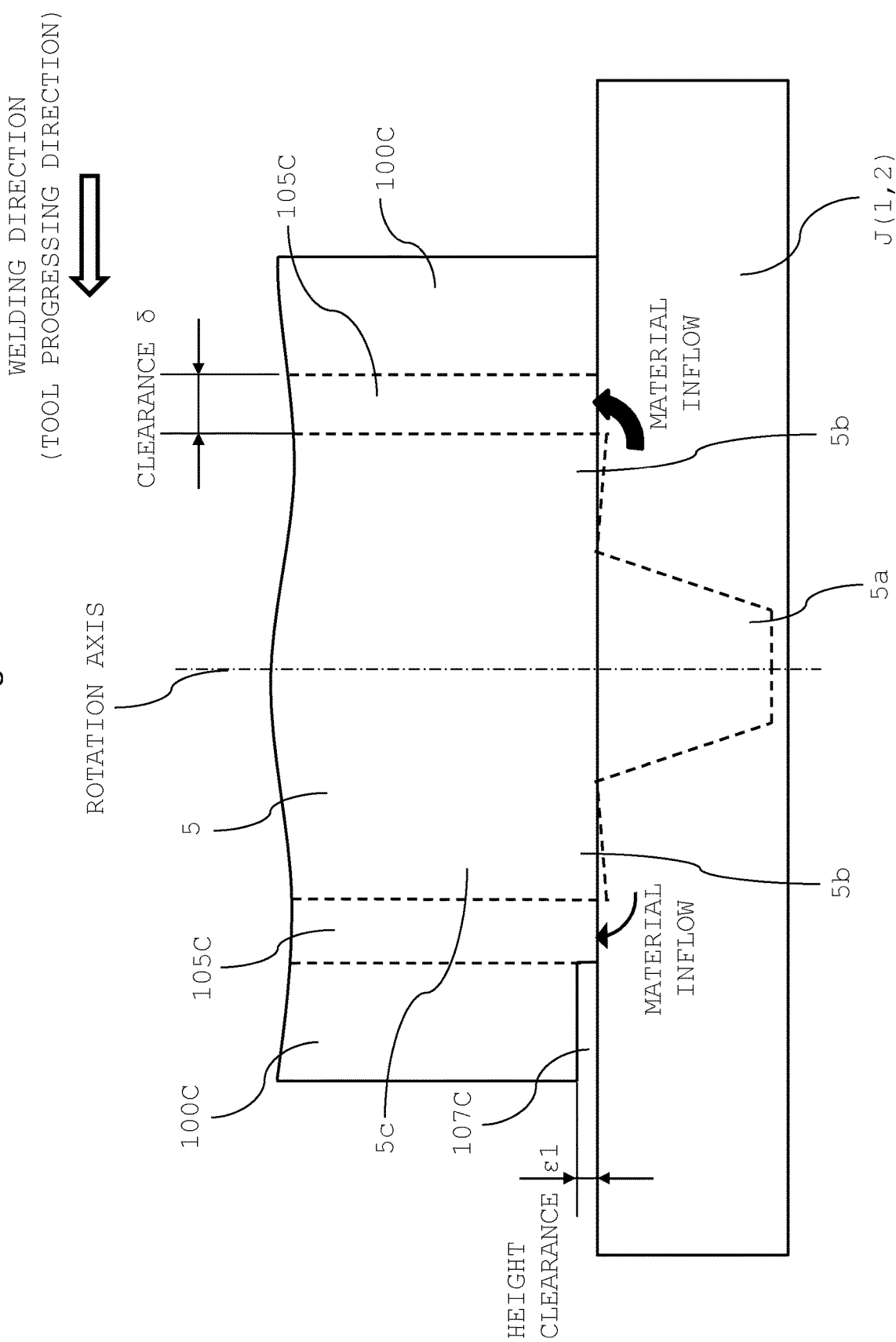
FIG. 10 is a figure illustrating schematically an ironing plate provided in a friction stir welding apparatus according to a modification of Embodiment 2 of the present invention and the surroundings thereof.

A modification of the ironing plate for the friction stir welding apparatus and the friction stir welding apparatus including the same, and the friction stir welding method of the present embodiment will be described below, referring to FIG. 10. FIG. 10 is a figure illustrating schematically an ironing plate provided in a friction stir welding apparatus according to Modification of Embodiment 2 and the surroundings thereof.

In the present modification illustrated in FIG. 10, the ironing plate 100C is the same in structure and operation as the ironing plate 100B in Embodiment 2, except for the difference in the shape of the opening portion provided on the forward side in regard of the progressing direction of welding of the ironing plate 100C.

As depicted in FIG. 10, the ironing plate 100C in the present modification is provided with a rectangular parallelepiped gap 107C (opening portion) on the forward side in regard of the progressing direction of welding of the two metallic plates 1 and 2 by the friction stir welding apparatus 200. The height clearance of the gap 107C is ε1.

In the ironing plate 100c in the present modification, also, a material inflow passage 105C having a clearance δ into which surplus material flows is formed between the ironing plate 100C and the rotating tool 5 when the ironing plate 100C is disposed such as to surround an outer peripheral portion of the rotating tool 5.

According to such an ironing plate 100C and the friction stir welding method using the same of the present modification, also, substantially the same effects as those of the ironing plate 100B and the friction stir welding method using the same of Embodiment 2 described above are obtained.

Embodiment 3

Figure 11:
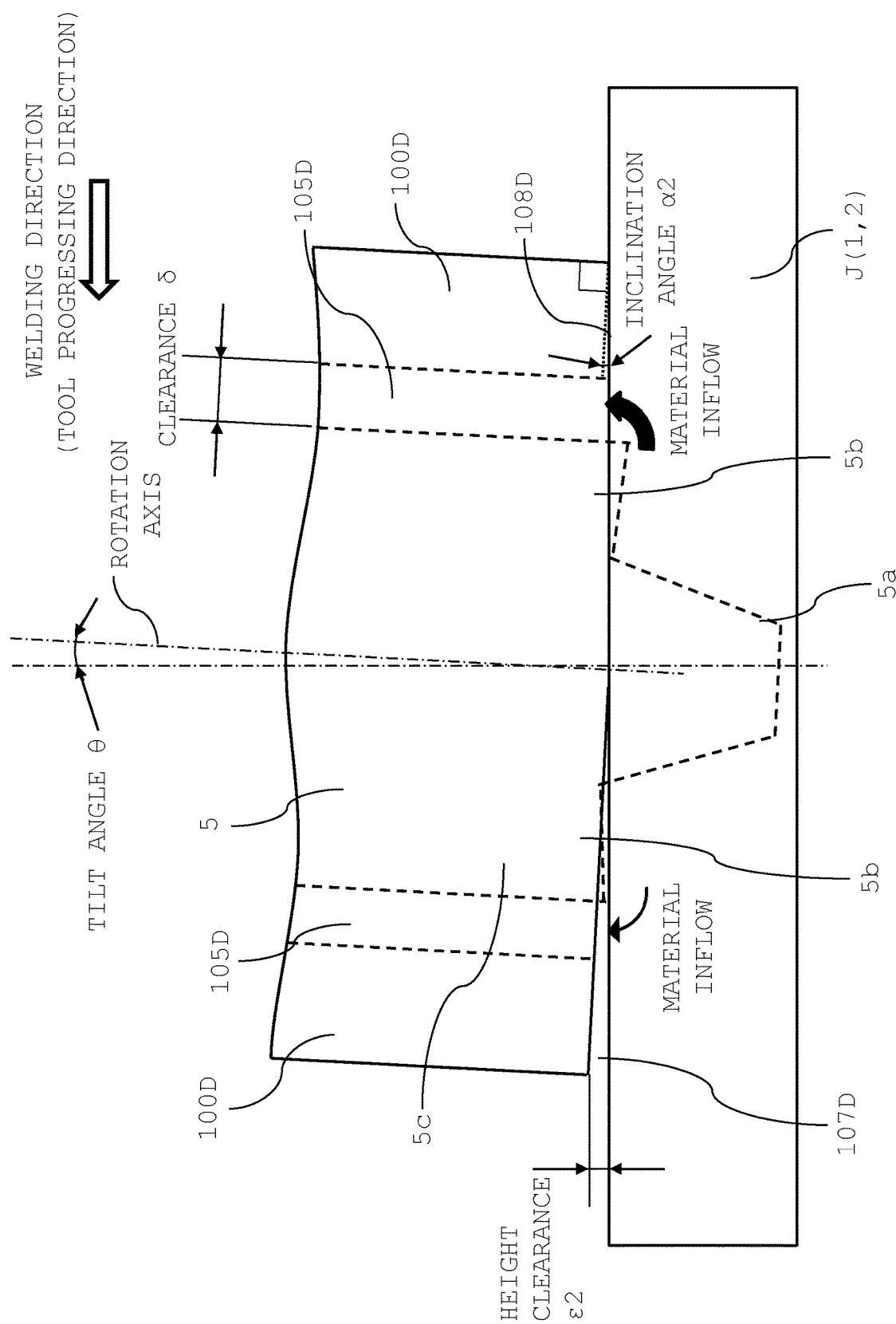
FIG. 11 is a figure illustrating schematically an ironing plate provided in a friction stir welding apparatus according to Embodiment 3 of the present invention and the surroundings thereof.

The ironing plate for the friction stir welding apparatus and the friction stir welding apparatus including the same, and the friction stir welding method according to Embodiment 3 of the present invention will be described, referring to FIG. 11. FIG. 11 is a figure illustrating schematically an ironing plate provided in a friction stir welding apparatus of Embodiment 3 and the surroundings thereof.

In the ironing plate 100D of the present embodiment depicted in FIG. 11, a part of that surface of the ironing plate 100D which faces the two metallic plates 1 and 2 has an inclined surface (first inclined surface) 108D inclined relative to a plane orthogonal to the rotation axis of the rotating tool 5, an intersection line formed by intersection of the plane orthogonal to the tool rotation axis and the inclined surface 108D is located on the forward side relative to the center of the ironing plate 100D in regard of the tool progressing direction, and the inclined surface 108D is formed on the backward side in regard of the progressing direction of the ironing plate 100D. In other points, the ironing plate 100D is the same in structure as the ironing plate 100B in Embodiment 2.

As illustrated in FIG. 11, in the ironing plate 100D in the present embodiment, a material inflow passage 105D having a clearance δ into which surplus material flows is formed between the ironing plate 100D and the rotating tool 5 when the ironing plate 100D is disposed such as to surround an outer peripheral portion of the rotating tool 5.

In addition, as depicted in FIG. 11, the ironing plate 100D of the present embodiment is formed, on the backward side in regard of the progressing direction of welding of the two metallic plates 1 and 2 by the friction stir welding apparatus 200, with an inclined surface 108D inclined relative to a plane orthogonal to the tool rotation axis. The inclination angle formed between the plane orthogonal to the tool rotation axis and the inclined surface 108D is $\alpha 2$.

Besides, in the present embodiment, friction stir welding is conducted by a method in which the axis of the rotating tool 5 is inclined toward the direction of preceding of the probe 5a relative to the progressing direction of the rotating tool 5, by an inclination support device 76 of an angle adjustment system, and the rotating tool 5 is moved along the joint part J while rotating the rotating tool 5 in a state in which the inclined surface 108D is in contact with the metallic plates 1 and 2. In this instance, the angle of inclination of the rotating tool 5 is referred to as tilt angle, and represented as the tilt angle θ. As for the relation between the inclination angle $\alpha 2$ and the tilt angle θ, it is desirable that the inclination angle $\alpha 2$ is equal to the tilt angle θ.

With the inclined surface 108D thus formed, a gap 107D (opening portion) is formed when the ironing plate 100D is disposed such as to surround an outer peripheral portion of the rotating tool 5. The gap 107D has a height clearance of $\epsilon 2$ on the forwardmost end side of the progressing direction.

According to the ironing plate 100D and the friction stir welding method using the same of Embodiment 3 of the present invention, also, substantially the same effects as those of the ironing plate and the friction stir welding method using the same of Embodiment 1 or the like described above are obtained.

Here, if the pressing force is insufficient when the welding tool is given the tilt angle and high-speed welding (equal to or more than 1 m/min) is conducted, weld defects (groove defects in the surface or tunnel defects inside the joint part) would be generated.

As aforementioned, in order to restrain defective welding, the pressing force should be increased. When the tilt angle is provided in order to increase the pressing force, however, the opening is enlarged on the forward side in regard of the welding direction of the ironing plate disposed outside of the rotating tool 5, so that it would be difficult to keep at a high level the efficiency of inflow of burrs into the material inflow passage. In addition, on the backward direction in regard of the welding direction of the ironing plate, excessive insertion may be generated, so that defective bead surfaces may be generated, and, where the material strength is low, material breakage may be generated by the frictional force.

However, since the inclined surface 108D of the ironing plate 100D is present on the backward side in regard of the progressing direction of welding, the ironing plate 100D is not liable to hollow out the metallic plates 1 and 2 after welding. Therefore, the amount of surplus material is not increased, excessive insertion on the backward side can be prevented, and material breakage can be restrained. Further, since the ironing plate 100D makes contact with the surfaces of the metallic plates 1 and 2 on the backward side in regard of the welding direction like in Embodiment 2, the opening on the forward side can be narrowed, and discharge of burrs to the exterior of the ironing plate 100D can be prevented more effectively.

Note that, in the case of Embodiment 2, also, the intersection line formed between the plane orthogonal to the tool rotation axis and the inclined surface 108B1 may be located on the forward side relative to the center of the ironing plate 100B in the tool progressing direction, to thereby increase the area of contact between the ironing plate 100B and the metallic plates 1 and 2, like in the present embodiment. By this configuration, also, the opening on the forward side can be narrowed, and discharge of burrs to the exterior of the ironing plate 100B can be prevented more effectively.

<Modification 1 of Embodiment 3>

Figure 12:
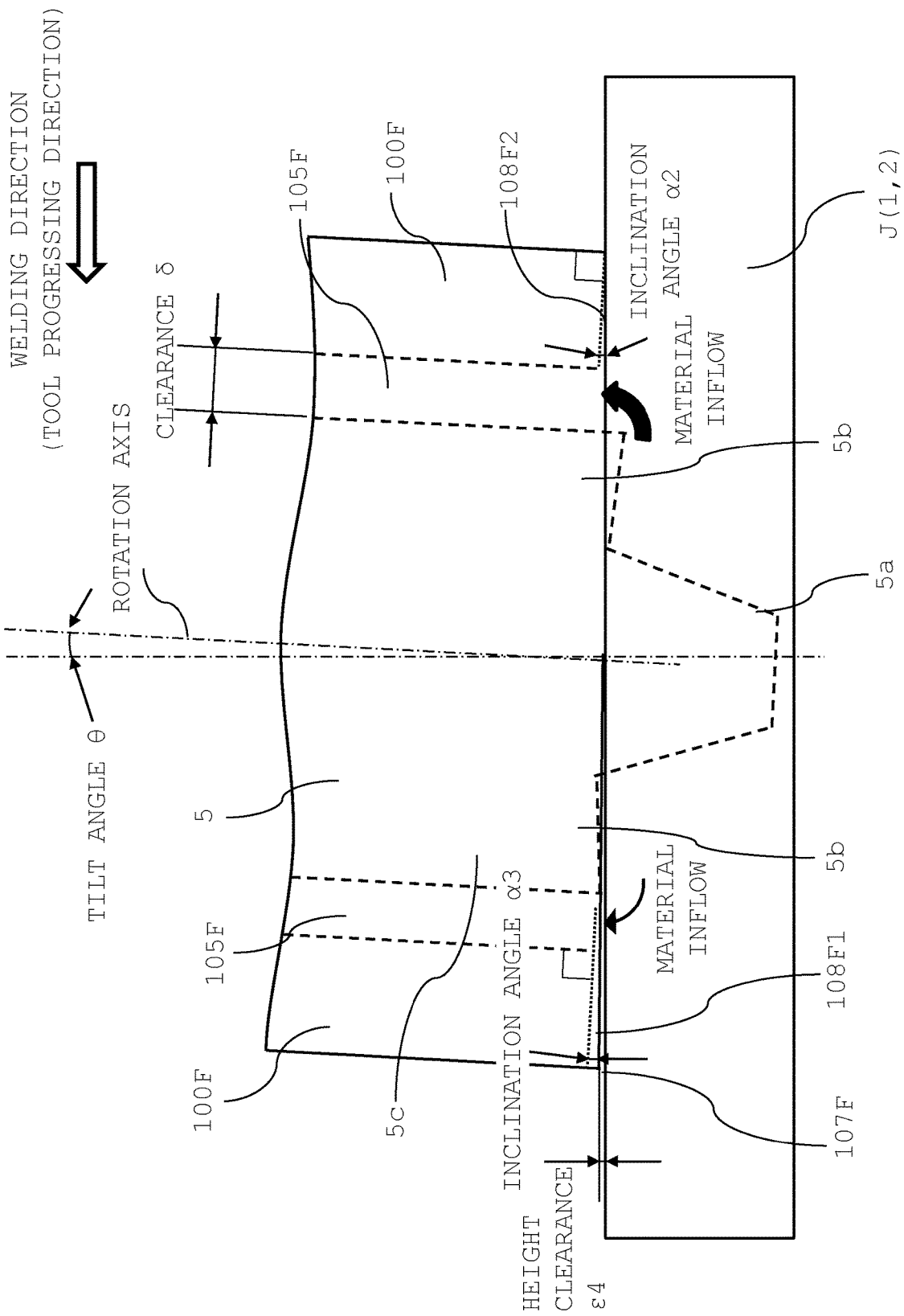
FIG. 12 is a figure illustrating schematically an ironing plate provided in a friction stir welding apparatus according to Modification 1 of Embodiment 3 of the present invention and the surroundings thereof.

Modification 2 of the ironing plate for the friction stir welding apparatus and the friction stir welding apparatus including the same, and the friction stir welding method of Embodiment 3 will be described below, referring to FIG. 12. FIG. 12 is a figure illustrating schematically an ironing plate provided in a friction stir welding apparatus according to Modification 1 of Embodiment 3 and the surroundings thereof.

In the ironing plate 100F of the present modification illustrated in FIG. 12, a part of that surface of the ironing plate 100F which faces the two metallic plates 1 and 2 has an inclined surface (first inclined surface) 108F1 and an inclined surface (second inclined surface) 108F2 both inclined relative to a plane orthogonal to the rotation axis of the rotating tool 5. In addition, the inclined surfaces 108F1 and 108F2 are formed such that the inclination angle $\alpha 3$ of the inclined surface 108F1 on the forward side in regard of the progressing direction of welding of the two metallic plates 1 and 2 by the friction stir welding apparatus 200 is smaller than the inclination angle $\alpha 2$ of the inclined surface 108F2 on the backward side of the progressing direction. In other points, the ironing plate 100F is the same in structure as the ironing plate 100D of Embodiment 3.

As depicted in FIG. 12, according to the ironing plate 100F of the present modification, also, a material inflow passage 105F having a clearance δ into which surplus material flows is formed between the ironing plate 100F and the rotating tool 5 when the ironing plate 100F is disposed such as to surround an outer peripheral portion of the rotating tool 5.

In addition, also in the present modification, like in Embodiment 3, the axis of the rotating tool 5 of the friction stirring device 3 is inclined in such a manner that the tip side of the rotating tool 5 is located on the forward side in regard of the progressing direction of welding of the two metallic plates 1 and 2, by the inclination support device 76 of the angle adjustment system, and friction stir welding is performed in a state in which the rotating tool 5 and the ironing plate 100F are inclined. As for the relation between the inclination angle α2 and the tilt angle θ, it is desirable that the inclination angle α2 is equal to the tilt angle θ.

In this instance, with the inclination angle α3 of the inclined surface 108F1 on the forward side in regard of the progressing direction set smaller than the inclination angle α2 of the inclined surface 108F2 on the backward side in regard of the progressing direction, a gap 107F (opening portion) is formed when the ironing plate 100F is disposed such as to surround an outer peripheral portion of the rotating tool 5. The gap 107F has a height clearance of ε4 (<ε2) on the forwardmost end side in regard of the progressing direction.

According to such an ironing plate 100F and the friction stir welding method using the same of the present modification, also, substantially the same effects of the ironing plate 100D and the friction stir welding method using the same of Embodiment 3 described above are obtained.

In addition, since the inclination angle α3 of the inclined surface 108F1 on the forward side in regard of the progressing direction is smaller than the inclination angle α2 of the inclined surface 108F2 on the backward side in regard of the progressing direction, the degree of opening is smaller on the forward side in regard of the progressing direction, and, therefore, protrusion of surplus material can be restrained more assuredly, as compared to the case of using the ironing plate 100D of Embodiment 3.

Note that, in the case of the present modification, also, the intersection line formed between the inclined surface 108F1 and the inclined surface 108F2 may be disposed on the forward side relative to the center of the ironing plate 100F in regard of the tool progressing direction, to increase the area of contact between the ironing plate 100F and the metallic plates 1 and 2. By this configuration, also, the opening on the forward side can be narrowed, and discharge of burrs to the exterior of the ironing plate 100F can be prevented more effectively.

Embodiment 4

Figure 13:
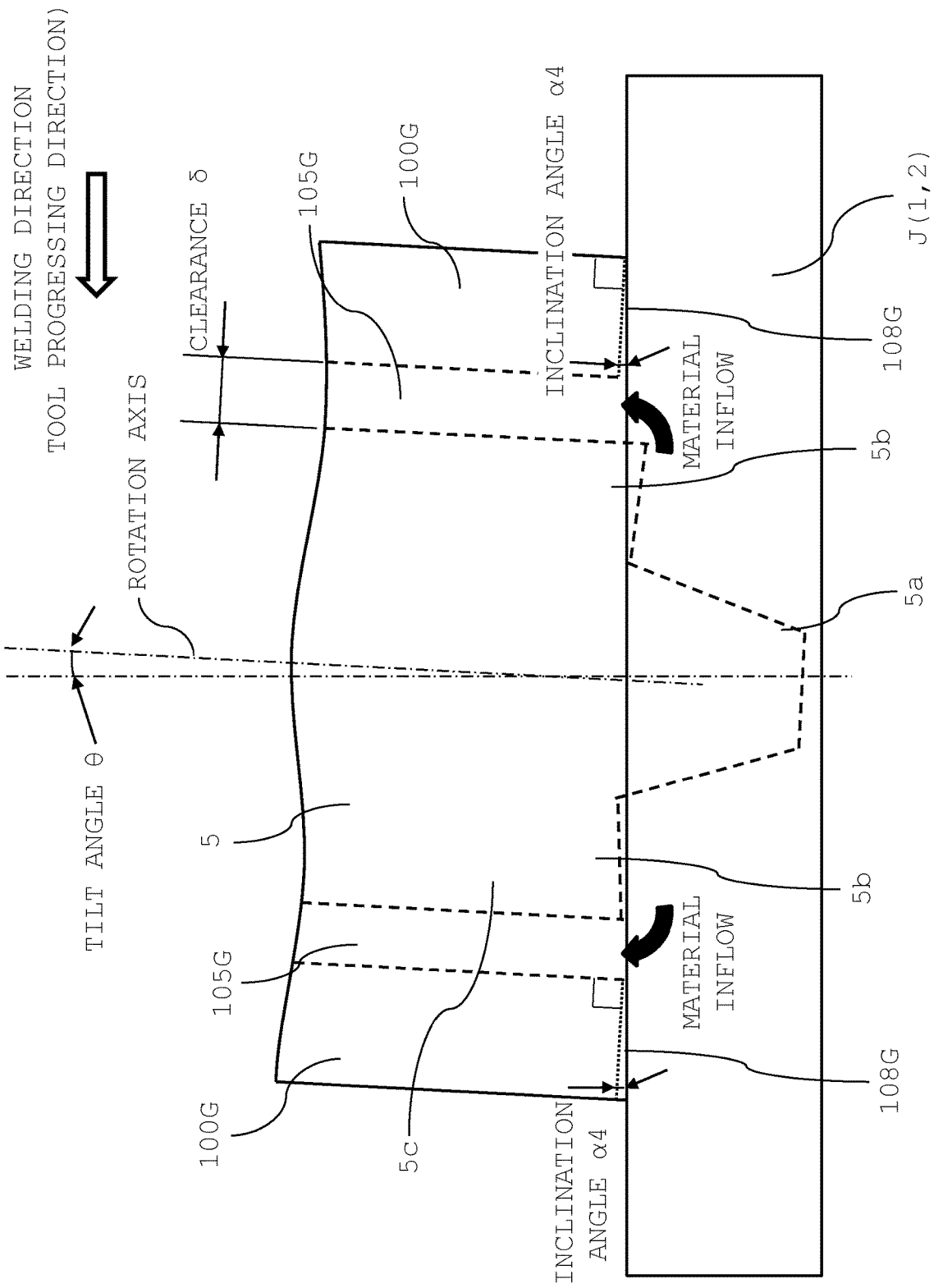
FIG. 13 is a figure illustrating schematically an ironing plate provided in a friction stir welding apparatus according to Embodiment 4 of the present invention and the surroundings thereof.

The ironing plate for the friction stir welding apparatus and the friction stir welding apparatus including the same, and the friction stir welding method according to Embodiment 4 of the present invention will be described, referring to FIG. 13. FIG. 13 is a figure illustrating schematically an ironing plate provided in a friction stir welding apparatus of Embodiment 4 and the surroundings thereof.

In the ironing plate 100G of the present embodiment illustrated in FIG. 13, whole part of that surface of the ironing plate 100G which faces two metallic plates 1 and 2 has an inclined surface (first inclined surface) 108G inclined relative to a plane orthogonal to the rotation axis of the rotating tool 5, and the inclination angle α4 of the inclined surface 108G is equal to the tilt angle θ of the rotating tool 5. In other points, the ironing plate 100G is the same in structure as the ironing plate 100D of Embodiment 3.

As depicted in FIG. 13, in the ironing plate 100G of the present embodiment, also, a material inflow passage 105G having a clearance δ into which surplus material flows is formed between the ironing plate 100G and the rotating tool 5 when the ironing plate 100G is disposed such as to surround an outer peripheral portion of the rotating tool 5.

In the ironing plate 100G and the friction stir welding method using the same according to Embodiment 4 of the present invention, that surface of the ironing plate 100G which faces the two metallic plates 1 and 2 includes the one inclined surface 108G inclined relative to the plane orthogonal to the rotation axis of the rotating tool 5, and the inclination angle α4 of the inclined surface 108G is equal to the tilt angle θ of the rotating tool 5. By this, even in the case of performing friction stir welding with the rotating tool 5 inclined, the ironing plate 100G can be put in close contact with the metallic plates 1 and 2. Consequently, substantially the same effects as those of the ironing plate and the friction stir welding method using the same according to Embodiment 1 or the like described above are obtained.

Embodiment 5

Figure 14:
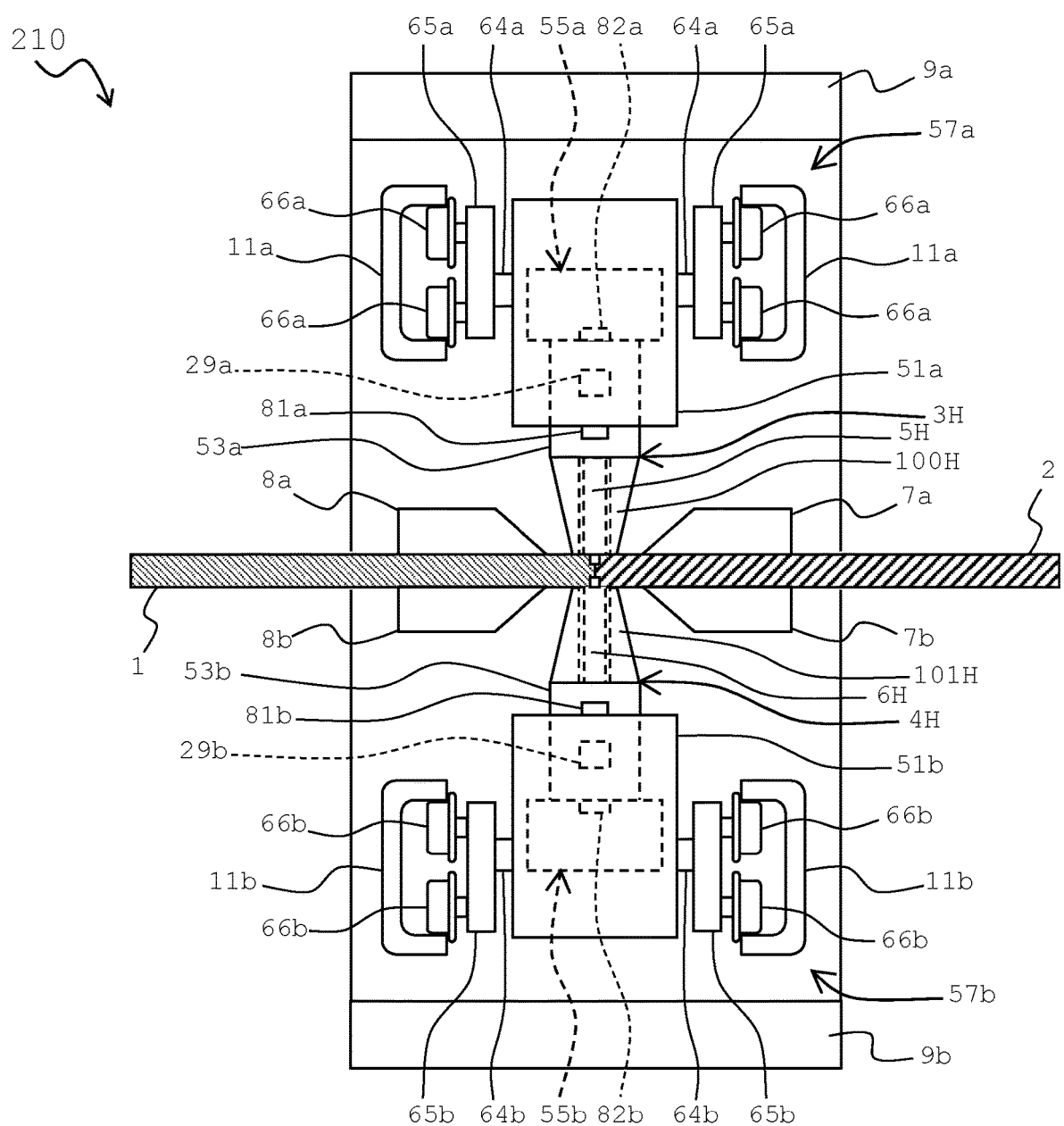
FIG. 14 is a figure illustrating schematically a both-side friction stir welding apparatus according to Embodiment 5 of the present invention.
Figure 15:
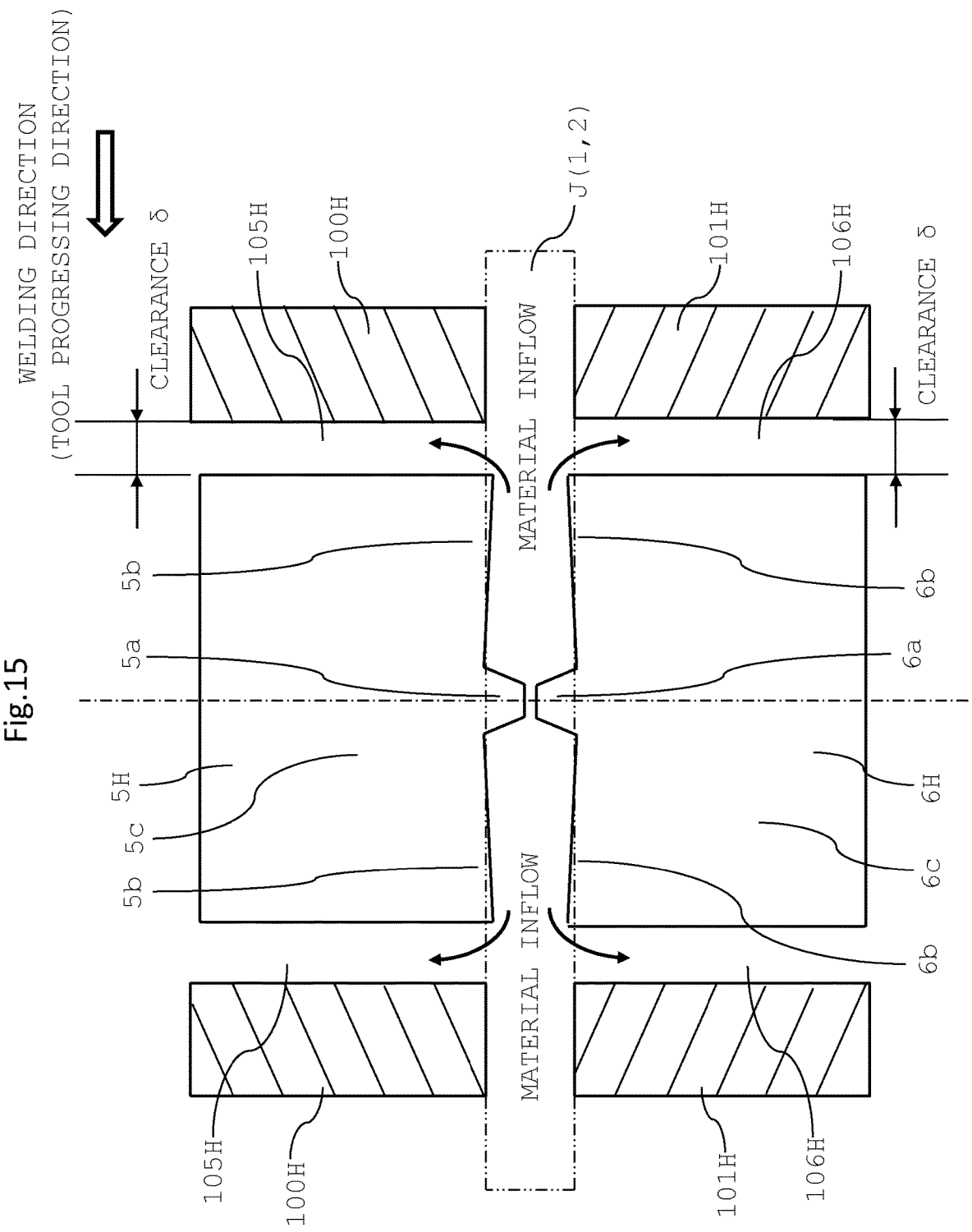
FIG. 15 is a figure illustrating schematically an ironing plate provided in the both-side friction stir welding apparatus of Embodiment 5 of the present invention and the surroundings thereof.

The ironing plate for the friction stir welding apparatus and the friction stir welding apparatus, and the friction stir welding method according to Embodiment 5 of the present invention will be described referring to FIGS. 14 and 15. FIG. 14 is a figure illustrating schematically a both-side friction stir welding apparatus of Embodiment 5, and FIG. 15 is a figure illustrating schematically an ironing plate provided in the both-side friction stir welding apparatus of Embodiment 5 and the surroundings thereof.

Unlike in Embodiment 1 and the like, the friction stir welding apparatus of the present embodiment depicted in FIG. 14 has friction stirring devices disposed on both sides of the metallic plates 1 and 2.

In the present embodiment, a case where an ironing plate of the same shape as the ironing plate 100 of Embodiment 1 is mounted is described. However, this ironing plate may be replaced, as required, by any of the ironing plates of the modifications of Embodiment 1, Embodiments 2 to 4, and their modifications. Besides, the ironing plates of the same shape may be mounted on both sides, or ironing plates of different shapes may be mounted respectively on both sides.

As illustrated in FIG. 14, the both-side friction stir welding apparatus 210 of the present embodiments includes gripping plates 7a and 7b, gripping plates 8a and 8b, an upper friction stirring device 3H, a lower friction stirring device 4H, an upper rotating tool pressing force adjusting device 55a, a lower rotating tool pressing force adjusting device 55b, an upper moving device 57a, and a lower moving device 57b, and has a structure in which the friction stirring device 3 described in Embodiment 1 is disposed on each of the upper and lower sides of the metallic plates 1 and 2, in symmetry.

For example, the upper friction stirring device 3H is basically the same in structure as the friction stirring device 3 described in Embodiment 1, and reference symbols for those components of the upper friction stirring device 3H which are equivalent to the components of the friction stirring device 3 are accompanied with suffix a.

Similarly, the lower friction stirring device 4H is the friction stirring device 3, namely, the upper friction stirring device 3H, disposed on the opposite side of the metallic plates 1 and 2, and is the same in structure as the upper friction stirring device 3H. Therefore, reference symbols for those components of the lower friction stirring device 4H which are equivalent to the components of the upper friction stirring device 3H are accompanied with suffix b, in place of suffix a.

In the upper friction stirring device 3H, an upper rotating tool 5H and an ironing plate 100H disposed on the face side of a joint part J of metallic plates 1 and 2 are mounted. In the lower friction stirring device 4H, a lower rotating tool 6H and an ironing plate 101H disposed on the back side of the joint part J of the metallic plates 1 and 2 are mounted.

In the configuration illustrated in FIG. 14, the synchronization between the axes of the upper rotating tool 5H and the lower rotating tool 6H at the time when the upper friction stirring device 3H runs on upper rails 11a and the lower friction stirring device 4H runs on lower rails 11b is conducted by an electric control system in which the controller 83 (see FIG. 3) performs synchronous control of a running motor 67a of the upper moving device 57a and a running motor 67b of the lower moving device 57b.

The both-side friction stir welding apparatus according to the present embodiment includes: an upper inclination support device 76a by which the axis of the upper rotating tool 5H of the upper friction stirring device 3H is supported in a state of being inclined toward the direction of preceding of a probe 5a relative to the progressing direction of the upper rotating tool 5H; and a lower inclination support device 76b by which the axis of the lower rotating tool 6H of the lower friction stirring device 4H is supported in a state of being inclined toward the direction of preceding of a probe 6a relative to the progressing direction of the lower rotating tool 6H.

A difference of the present embodiment from the above-described embodiments and modifications lies in that the devices for gripping the face and back sides of the metallic plate 1 are not the gripping device 8 and the back plate 110 but are gripping plates 8a and 8b, and the devices for gripping the face and back sides of the metallic plate 2 are not the gripping device 7 and the back plate 110 but are gripping plates 7a and 7b.

An outline of the upper rotating tool 5H and the lower rotating tool 6H of the both-side friction stir welding apparatus of the present embodiment will be described below, referring to FIG. 15.

As illustrated in FIG. 15, the upper rotating tool 5H is the same in configuration as the rotating tool 5 described in Embodiment 1. In addition, the ironing plate 100H is the same in configuration as the ironing plate 100 described in Embodiment 1.

Further, as depicted in FIG. 15, the lower rotating tool 6H is the same in configuration as the upper rotating tool 5H, and the ironing plate 101H is the same in configuration as the ironing plate 100H.

Therefore, a material inflow passage 105H into which surplus material of the two metallic plates 1 and 2 flows is formed between the ironing plate 100H and the upper rotating tool 5H when the ironing plate 100H is disposed such as to surround an outer peripheral portion of the upper rotating tool 5H. In addition, a material inflow passage 106H into which surplus material of the two metallic plates 1 and 2 flows is formed between the ironing plate 101H and the lower rotating tool 6H when the ironing plate 101H is disposed such as to surround the outer peripheral portion of the lower rotating tool 6H. The details of these material inflow passages 105H and 106H also are the same as details of the material inflow passage 105 described in Embodiment 1.

The upper rotating tool 5H, the lower rotating tool 6H, and the ironing plates 100H and 101H are also mounted such as to be independently detachable from the upper friction stirring device 3H or the lower friction stirring device 4H, and, when consumed, can be replaced by new ones, respectively.

The friction stir welding method according to the present embodiment that is preferably performed using the aforementioned both-side friction stir welding apparatus of the present embodiment will be described below.

First, in the case of performing butt welding of the metallic plates 1 and 2 by both-side friction stir welding, the upper rotating tool 5H is inserted into the joint part J of the two metallic plates 1 and 2 from the face side thereof, whereas the lower rotating tool 6H is inserted into the joint part J of the two metallic plates 1 and 2 from the back side thereof, and friction stirring is conducted utilizing frictional heat generated by rotating the upper rotating tool 5H and the lower rotating tool 6H, to thereby weld the two metallic plates 1 and 2.

In the welding method according to the present embodiment, first, the face and back sides of the metallic plate 2 are gripped by the gripping plates 7a and 7b, whereas the face and back sides of the metallic plate 1 are gripped by the gripping plates 8a and 8b.

Next, the upper rotating tool pressing force adjusting device 55a and the lower rotating tool pressing force adjusting device 55b are driven, to move the upper rotating tool 5H and the lower rotating tool 6H toward each other, and to give a predetermined gap between the tip of the probe 5a of the upper rotating tool 5H and the tip of the probe 6a of the lower rotating tool 6H. In addition, the upper friction stirring device 3H and the lower friction stirring device 4H are driven, whereby the upper rotating tool 5H and the lower rotating tool 6H disposed to face each other are rotated in opposite directions, and the shoulder portion 5b of the upper rotating tool 5H and the shoulder portion 6b of the lower rotating tool 6H are pressed against the face side and the back side of the butting part which is the joint part J of the two metallic plates 1 and 2, to perform friction stirring.

In this instance, it is desirable that the pressing force with which the upper rotating tool 5H presses the joint part J of the metallic plates 1 and 2 from the face side thereof and the pressing force with which the lower rotating tool 6H presses the joint part J of the metallic plates 1 and 2 from the back side thereof are the same.

Thereafter, the upper moving device 57a and the lower moving device 57b are driven, to move the upper rotating tool 5H and the lower rotating tool 6H in the direction orthogonal to the progressing direction of the metallic plates 1 and 2 while rotating the rotating tools along the joint part J, thereby performing friction stir welding.

In this instance, surplus material generated from a gap between a part corresponding to an edge end of the shoulder portion 5b and the face-side surfaces of the metallic plates 1 and 2 flows into the material inflow passage 105H formed between the upper rotating tool 5H and the ironing plate 100H. In addition, surplus material generated from a gap between a part corresponding to an edge end of the shoulder portion 6b and the back-side surfaces of the metallic plates 1 and 2 flows into the material inflow passage 106H formed between the lower rotating tool 6H and the ironing plate 101H. Therefore, discharge of the surplus material to the advancing side or the retreating side of the bead is restrained.

The other configurations and operations are roughly the same as the configurations and operations in the aforementioned friction stir welding apparatus and method of Embodiment 1, and details thereof are omitted here.

According to the both-side friction stir welding apparatus and the friction stir welding method of Embodiment 5 of the present invention, also, substantially the same effects as those of the Embodiment 1 and the like described above are obtained.

<Modification 1 of Embodiment 5>

Figure 16:
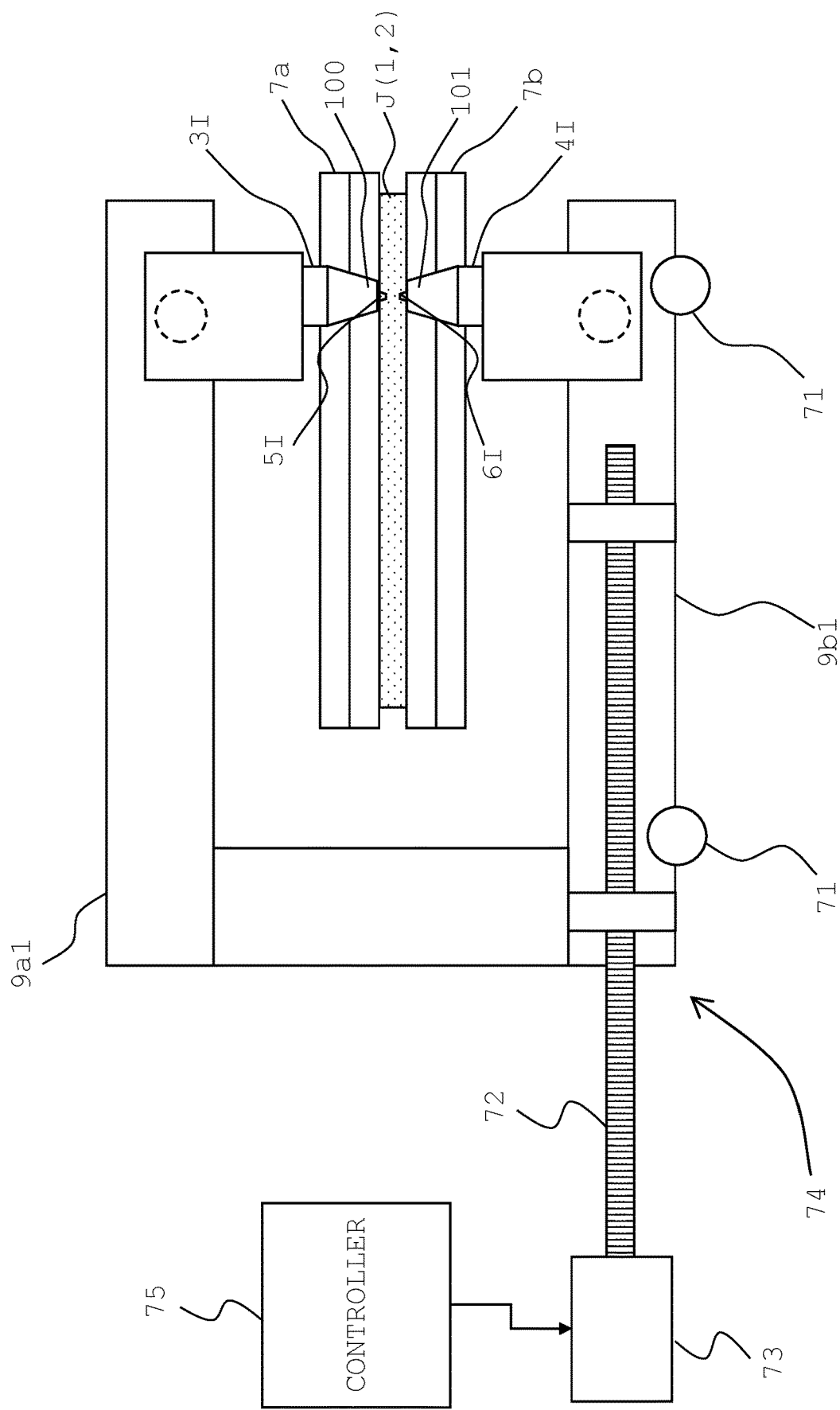
FIG. 16 is a figure illustrating schematically a both-side friction stir welding apparatus according to Modification 1 of Embodiment 5 of the present invention.

Modification 1 of the ironing plate for the friction stir welding apparatus and the friction stir welding apparatus, and the friction stir welding method of the present embodiment will be described below, referring to FIG. 16. FIG. 16 is a figure illustrating schematically a both-side friction stir welding apparatus of Modification 1 of Embodiment 5.

The friction stir welding apparatus of Modification 1 illustrated in FIG. 16 has a configuration in which heads of friction stir welding devices are mounted on a C frame, and the upper and lower heads are mechanically synchronized. In other points of configuration, the friction stir welding apparatus of the present modification is the same in structures and operations as the both-side friction stir welding apparatus of Embodiment 5.

As depicted in FIG. 16, an upper friction stirring device 3I of Modification 1 is fixed to a housing 9a1 of upper and lower housings 9a1 and 9b1 integrally connected in a C fashion, and a lower friction stirring device 4I is fixed to the housing 9b1. The C-type housings 9a1 and 9b1 are provided with a running device 74 which includes wheels 71, a screw 72, and a running motor 73.

The wheels 71 are provided on the housing 9b1, the screw 72 is engaged with the housing 9b1, and the running motor 73 rotationally drives the screw 72. When the running motor 73 is driven by an instruction from a controller 75, the screw 72 is rotated, and the housings 9a1 and 9b1 run in a direction orthogonal to the progressing direction of metallic plates 1 and 2 in a state in which axes of an upper rotating tool 5I and a lower rotating tool 6I are synchronized.

According to the both-side friction stir welding apparatus of the present modification, also, substantially the same effects as those of the both-side friction stir welding apparatus of Embodiment 5 described above are obtained.

In addition, the configuration can be simplified, the control is easy, and a reduction in cost can be realized.

<Modification 2 of Embodiment 5>

Figure 17:
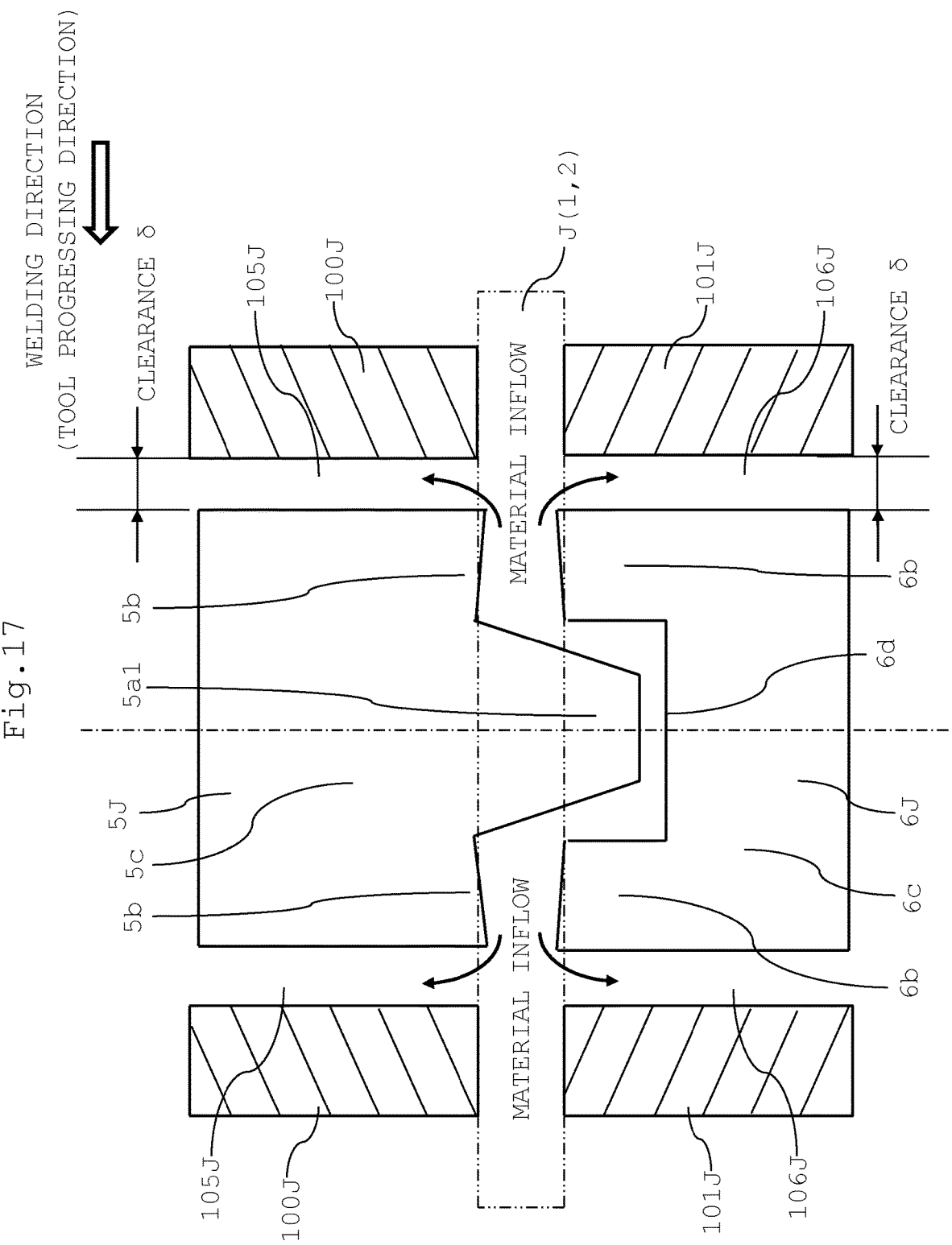
FIG. 17 is a figure illustrating schematically an ironing plate provided in a both-side friction stir welding apparatus according to Modification 2 of Embodiment 5 of the present invention and the surroundings thereof.

Modification 2 of the ironing plate for the friction stir welding apparatus and the friction stir welding apparatus, and the friction stir welding method of the present embodiment will be described below, referring to FIG. 17. FIG. 17 is a figure illustrating schematically an ironing plate provided in a both-side friction stir welding apparatus of Modification 2 of Embodiment 5 and the surroundings thereof.

The both-side friction stir welding apparatus of Modification 2 illustrated in FIG. 17 is the same in structure and operation as the both-side friction stir welding apparatus of Embodiment 5, except for the difference in the shape of rotating tools.

In FIG. 17, the both-side friction stir welding apparatus according to the present modification includes an upper rotating tool 5J and a lower rotating tool 6J which are disposed such as to face the face side and the back side of a joint part J of two metallic plates 1 and 2, and which performs friction stirring of the joint part J.

The upper rotating tool 5J includes a tool main body 5c formed at a tip portion thereof with a shoulder portion 5b for pressing the joint part J, and a pin-shaped probe 5a1 (projecting portion) formed at a tip portion of the tool main body 5c such as to project from the shoulder portion 5b.

As depicted in FIG. 17, an inside diameter of a part of an ironing plate 100J in which the upper rotating tool 5J is inserted is larger than the tool main body 5c of the upper rotating tool 5J, and a material inflow passage 105J into which surplus material of the two metallic plates 1 and 2 flows is formed between the ironing plate 100J and the upper rotating tool 5J when the ironing plate 100J is disposed such as to surround an outer peripheral portion of the upper rotating tool 5J.

The lower rotating tool 6J includes a tool main body 6c formed at a tip portion thereof with a shoulder portion 6b for pressing the joint part J, and a recess 6d which is formed in the shoulder portion 6b of the tool main body 6c and accommodates a tip portion of a probe 5a1 at the time of welding of the two metallic plates 1 and 2.

As illustrated in FIG. 17, an inside diameter of a part of the ironing plate 101J in which the lower rotating tool 6J is inserted is larger than the tool main body 6c of the lower rotating tool 6J, and a material inflow passage 106J into which surplus material of the two metallic plates 1 and 2 flows is formed between the ironing plate 101J and the lower rotating tool 6J when the ironing plate 101J is disposed such as to surround an outer peripheral portion of the lower rotating tool 6J.

The probe 5a1 of the upper rotating tool 5J has a cylindrical outer peripheral shape, and the recess 6d of the lower rotating tool 6J also has a cylindrical inner peripheral shape. In a state in which a tip of the probe 5a1 is inserted in the recess 6d, a cylindrical annular gap is formed between them.

An outline of the friction stir welding method of the present modification is as follows.

First, the upper rotating tool 5J and the lower rotating tool 6J are disposed such as to face the face side and the back side of the joint part J of the two metallic plates 1 and 2.

Next, the upper rotating tool 5J and the lower rotating tool 6J are moved toward each other while being rotated, to insert the tip portion of the probe 5a1 of the upper rotating tool 5J into the recess 6d of the lower rotating tool 6J, and the shoulder portion 5b of the upper rotating tool 5J and the shoulder portion 6b of the lower rotating tool 6J are pressed against the face side and the back side of the joint part J.

Subsequently, the upper rotating tool 5J and the lower rotating tool 6J are moved along the joint part J while being rotated. At the time of friction stirring during this movement, the probe 5a1 is in the state of projecting into the whole range of plate thickness of the joint part J. By this, the whole range of plate thickness of the joint part J is subjected to friction stirring, and the two metallic plates 1 and 2 are welded in the whole range of plate thickness of the joint part J.

In this instance, on the face side of the metallic plates 1 and 2, surplus material generated from a gap between a part corresponding to an edge end of the shoulder portion 5b and the surfaces of the metallic plates 1 and 2 flows into the material inflow passage 105J formed between the upper rotating tool 5J and the ironing plate 100J. Similarly, in the back side of the metallic plates 1 and 2, surplus material generated from a gap between a part corresponding to an edge end of the shoulder portion 6b and the surfaces of the metallic plates 1 and 2 flows into the material inflow passage 106J formed between the lower rotating tool 6J and the ironing plate 101J. Therefore, discharge of the surplus material as burrs to the advancing side or the retreating side of the bead is restrained.

According to the both-side friction stir welding apparatus of the present modification, also, substantially the same effects as those of the both-side friction stir welding apparatus of Embodiment 5 described above are obtained.

<Others>

Note that the present invention is not to be limited to the above-described embodiments, but includes various modifications. The above embodiments have been described in detail for the purpose of describing the present invention in an easily understandable manner, and are not necessarily limited to those which include all the configurations described.

In addition, part of the configuration of one embodiment may be replaced by the configuration of other embodiment, and the configuration of one embodiment may be added to the configuration of other embodiment. Besides, in regard of part of the configuration of each embodiment, there may be made addition, deletion or replacement of or by other configuration.

DESCRIPTION OF REFERENCE CHARACTERS 1, 2 . . . metallic plate
3 . . . friction stirring device
3H, 3I . . . upper friction stirring device
4H, 4I . . . lower friction stirring device
5, 5A, 5B . . . rotating tool
5a, 5a1 . . . probe
5b, 5b1, 5b2 . . . shoulder portion
5c . . . tool main body
5H, 5I, 5J . . . upper rotating tool
6H, 6I, 6J . . . lower rotating tool
6a . . . probe
6b . . . shoulder portion
6c . . . tool main body
6d . . . recess
30 . . . burrs
32 . . . advantage side
33 . . . retrieving side
34 . . . bead
55 . . . rotating tool pressing force adjusting device
57 . . . moving device
76 . . . inclination support device
76a . . . upper inclination support device
76b . . . lower inclination support device
90 . . . ironing plate pressing force adjusting means
100, 100A, 100B, 100C, 100D, 100E, 100F, 100G, 100H, 100J, 101H, 101J . . . ironing plate
105, 105A, 105B, 105C, 105D, 105E, 105F, 105G, 105H, 105J, 106H, 106J . . . material inflow passage
107B, 107C, 107D, 107E, 107F . . . gap
108B1, 108D, 108F1, 108F2, 108G . . . inclined surface
109 . . . intersection line
200 . . . friction stir welding apparatus
210 . . . both-side friction stir welding apparatus

What is claimed is:

1. An ironing plate for a friction stir welding apparatus, the ironing plate mounted to the friction stir welding apparatus, the friction stir welding apparatus welding two metallic plates through friction stirring while utilizing frictional heat generated by rotating a rotating tool,
wherein the ironing plate is mounted to the friction stir welding apparatus in such a manner as to surround an outer peripheral portion of the rotating tool and does not rotate together with the rotating tool,
wherein an inside diameter of a portion of the ironing plate in which the rotating tool is inserted is larger than the rotating tool, and, when the ironing plate is disposed in such a manner as to surround the outer peripheral portion of the rotating tool, a material inflow passage into which a surplus material generated due to the welding of the two metallic plates flows is formed between the ironing plate and the rotating tool,
wherein a surface of the ironing plate facing the two metallic plates has a first inclined surface inclined relative to a plane orthogonal to a rotation axis of the rotating tool, and
wherein the first inclined surface is provided on a backward facing side with respect to a progressing direction of the welding of the two metallic plates by the friction stir welding apparatus, the first inclined surface extending from an outer peripheral portion of the ironing plate to at least the material inflow passage formed between the ironing plate and the rotating tool.

2. The ironing plate for a friction stir welding apparatus according to claim 1,
wherein an intersection line formed by the plane orthogonal to the rotation axis of the rotating tool and the first inclined surface is formed on a forward side in regard of a progressing direction of the welding of the two metallic plates by the friction stir welding apparatus.

3. The ironing plate for a friction stir welding apparatus according to claim 1, further comprising:
a second inclined surface inclined relative to the plane orthogonal to the rotation axis of the rotating tool,
wherein the second inclined surface is provided on a forward facing side with respect to the progressing direction of the welding of the two metallic plates by the friction stir welding apparatus, and
wherein an inclination angle of the first inclined surface relative to the plane orthogonal to the rotation axis of the rotating tool is larger than an inclination angle of the second inclined surface relative to the plane orthogonal to the rotation axis of the rotating tool.

4. The ironing plate for a friction stir welding apparatus according to claim 2, further comprising:
a second inclined surface inclined relative to the plane orthogonal to the rotation axis of the rotating tool,
wherein the second inclined surface is provided on a forward facing side with respect to the progressing direction of the welding of the two metallic plates by the friction stir welding apparatus, and
wherein an inclination angle of the first inclined surface relative to the plane orthogonal to the rotation axis of the rotating tool is larger than an inclination angle of the second inclined surface relative to the plane orthogonal to the rotation axis of the rotating tool.

5. The ironing plate for a friction stir welding apparatus according to claim 1,
wherein the surface facing the two metallic plates is formed of only the first inclined surface.

6. A friction stir welding apparatus that disposes a rotating tool at a surface of a joint portion of two metallic plates, and moves the rotating tool along the joint part in a state of pressing the surface of the metallic plate while rotating the rotating tool, to perform friction stir welding of the two metallic plates, the friction stir welding apparatus comprising:
the rotating tool; and
the ironing plate for a friction stir welding apparatus according to claim 1.

7. The friction stir welding apparatus according to claim 6, further comprising:
an inclining device that inclines the rotating tool and the ironing plate in such a manner that a tip side of the rotating tool is located on a forward side in regard of a progressing direction of the welding of the two metallic plates.

8. The friction stir welding apparatus according to claim 6, wherein the rotating tool is provided at a tip portion thereof with a shoulder portion that makes contact with the metallic plate, and a probe smaller than the rotating tool in diameter.

9. The friction stir welding apparatus according to claim 6, comprising:
pressing force adjusting means configured to press the ironing plate against the surface of the metallic plate.

10. The friction stir welding apparatus according to claim 7, comprising:
pressing force adjusting means configured to press the ironing plate against the surface of the metallic plate.

11. The friction stir welding apparatus according to claim 8, comprising:
pressing force adjusting means configured to press the ironing plate against the surface of the metallic plate.

12. A friction stir welding method comprising:
welding two metallic plates by the friction stir welding apparatus according to claim 6.

* * * * *